United States Patent
Gao et al.

(10) Patent No.: US 10,943,324 B2
(45) Date of Patent: Mar. 9, 2021

(54) DATA PROCESSING METHOD, APPARATUS, AND ELECTRONIC DEVICE

(71) Applicant: TENCENT TECHNOLOGY (SHENZHEN) COMPANY LIMITED, Guangdong (CN)

(72) Inventors: Jinchao Gao, Guangdong (CN); Yi Li, Guangdong (CN); Wei Xue, Guangdong (CN); Xing Jin, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 81 days.

(21) Appl. No.: 16/360,604

(22) Filed: Mar. 21, 2019

(65) Prior Publication Data

US 2019/0251654 A1  Aug. 15, 2019

Related U.S. Application Data

(63) Continuation of application No. PCT/CN2017/110827, filed on Nov. 14, 2017.

(30) Foreign Application Priority Data

Dec. 14, 2016 (CN) .......................... 201611155183.X

(51) Int. Cl.
*G06T 1/20* (2006.01)
*G06T 1/60* (2006.01)
(Continued)

(52) U.S. Cl.
CPC ............ *G06T 1/20* (2013.01); *G06K 9/00986* (2013.01); *G06K 9/6256* (2013.01); *G06N 20/00* (2019.01); *G06N 99/00* (2013.01); *G06T 1/60* (2013.01)

(58) Field of Classification Search
None
See application file for complete search history.

(56) References Cited

U.S. PATENT DOCUMENTS 9,607,355 B2   3/2017  Zou et al.
2016/0321776 A1  11/2016  Zou et al.
2018/0365824 A1*  12/2018  Yuh ........................ G06T 7/0012

FOREIGN PATENT DOCUMENTS

CN   104036451 A   9/2014
CN   104463324 A   3/2015
(Continued)

OTHER PUBLICATIONS

International Search Report dated Feb. 13, 2018 in application No. PCT/CN2017/110827 (with partial English translation), 8 pages.
(Continued)

*Primary Examiner* — Leon Viet Q Nguyen
(74) *Attorney, Agent, or Firm* — Oblon, McClelland, Maier & Neustadt, L.L.P.

(57) ABSTRACT

A data processing method is described. A processor provides different training data sets to a plurality of graphics processing units (GPUs), respectively. The processor controls the plurality of GPUs to generate respective sets of modification parameters by performing respective training processes in a parallel manner using respectively managed versions of a predictive model according to the corresponding training data sets. The processor controls the plurality of GPUs to exchange, before completion of the respective training processes, at least a portion of the sets of modification parameters that have been generated by the plurality of GPUs. The processor also causes the plurality of GPUs to modify the respectively managed versions of the predictive model according to at least the portion of the sets of modification parameters exchanged among the plurality of GPUs.

22 Claims, 6 Drawing Sheets

(51) Int. Cl.
　　　*G06N 20/00* 　　　(2019.01)
　　　*G06K 9/00* 　　　(2006.01)
　　　*G06K 9/62* 　　　(2006.01)
　　　*G06N 99/00* 　　　(2019.01)

(56) References Cited

FOREIGN PATENT DOCUMENTS

| CN | 104899641 A | 9/2015 |
| CN | 105224502 A | 1/2016 |

OTHER PUBLICATIONS

Chinese Written Opinion dated Feb. 13, 2016 in application No. PCT/CN2017/110827 (no English translation) 3 pages.

\* cited by examiner

DATA PROCESSING METHOD, APPARATUS, AND ELECTRONIC DEVICE

RELATED APPLICATION

This application is a continuation of International Application No. PCT/CN2017/110827, filed on Nov. 14, 2017, which claims priority to Chinese Patent Application No. 201611155183.X, entitled "DATA PROCESSING METHOD, DATA PROCESSING APPARATUS, AND ELECTRONIC DEVICE" filed with the Chinese Patent Office on Dec. 14, 2016. The entire disclosures of the prior applications are hereby incorporated by reference in their entirety.

FIELD OF THE TECHNOLOGY

This application relates to the field of computer technologies, and in particular, to data processing.

BACKGROUND OF THE DISCLOSURE

Deep learning is originated from research about artificial neural networks. A multi-layer perceptron including a plurality of hidden layers is one of deep learning structures for forming a predictive model. During the deep learning, an attribute type or feature is represented by combining lower-layer features into a more abstract higher layer, so as to implement distributed feature representations of data. In one example, a convolutional neural network architecture (Convolutional Architecture for Fast Feature Embedding, caffe) is widely applied to picture recognition and text recognition.

Deep learning requires a relatively strong calculation capability. In many applications, a graphics processing unit (GPU, or graphics processor) may be used to perform training processes to modify a predictive model according to training data. The GPU, also referred to as a visual processor, a display core, or a display chip, is a microprocessor specifically designed to perform image processing on personal computers, workstations, game machines, and some mobile devices (such as tablet computers and smartphones). To improve the data processing efficiency for picture recognition and/or text recognition related deep learning training, a plurality of GPUs is usually used to perform deep learning training in a parallel processing manner.

SUMMARY

Moreover, an acceleration ratio is a ratio of time consumed by a task in a single-processor system to time consumed by the same task in a multi-processor system. Embodiments of the present disclosure provide a method and an apparatus for improving the acceleration ratio of the deep learning training using a plurality of GPUs in a parallel processing manner.

According to an aspect, an embodiment of this application provides a data processing method. According to one example, a processor of a data processing apparatus provides by loading corresponding training data sets to a plurality of graphics processors GPUs respectively, different GPUs corresponding to different training data sets. The processor controls the plurality of GPUs to parallely perform training processes according to the corresponding training data sets, so that the GPUs obtain respective sets of modification parameters generated in a training process. The processor controls, in the process of parallely training according to the corresponding training data sets by the plurality of GPUs, the plurality of GPUs to perform exchange processing on the modification parameters generated through training by the plurality of GPUs, the number of modification parameters on which the exchange processing has been completed being greater than 0 when the training is completed.

According to another aspect, an embodiment of this application provides a data processing apparatus. The apparatus includes a training data set loading unit, configured to load corresponding training data sets to a plurality of graphics processors GPUs respectively, different GPUs corresponding to different training data sets; a training process control unit, configured to control the plurality of GPUs to parallely perform training processes according to the corresponding training data sets, so that the GPUs obtain respective modification parameters generated through training; and a parameter exchange control unit, configured to control, in the process of parallely training according to the corresponding training data sets by the plurality of GPUs, the plurality of GPUs to perform exchange processing on the modification parameters generated through training by the plurality of GPUs, the number of modification parameters on which the exchange processing has been completed being greater than 0 when the training is completed.

According to another aspect, an embodiment of this application provides a data processing method. According to one example, a processor of a data processing apparatus provide by loading corresponding training data sets to a plurality of graphics processors GPUs respectively, different GPUs corresponding to different training data sets. The processor controls the plurality of GPUs to parallely perform training processes according to the corresponding training data sets, so that the GPUs obtain respective modification parameters generated through training. The processor controls, in the process of parallely training according to the corresponding training data sets by the plurality of GPUs, the plurality of GPUs to perform exchange processing on the modification parameters generated through training by the plurality of GPUs, the number of modification parameters on which the exchange processing has been completed being greater than 0 when the training is completed.

According to another aspect, an embodiment of this application provides a data processing apparatus. The apparatus includes a training data set loading unit, configured to load corresponding training data sets to a plurality of graphics processors GPUs respectively, different GPUs corresponding to different training data sets; a training process control unit, configured to control the plurality of GPUs to parallely perform training processes according to the corresponding training data sets, so that the GPUs obtain respective modification parameters generated through training; and a parameter exchange control unit, configured to control, in the process of parallely training according to the corresponding training data sets by the plurality of GPUs, the plurality of GPUs to perform exchange processing on the modification parameters generated through training by the plurality of GPUs, the number of modification parameters on which the exchange processing has been completed being greater than 0 when the training is completed.

According to another aspect, an embodiment of this application provides a data processing device. The device includes: a processor and a memory, the memory being configured to store program code and transmit the program code to the processor; and the processor being configured to perform the data processing method according to one or more embodiments described in this disclosure based on an instruction in the program code.

According to another aspect, this application provides a storage medium, configured to store program code, the program code being configured to perform the data processing method according to one or more embodiments described in this disclosure.

According to another aspect, this application provides a computer program product including instructions, the computer program product, when running on a computer, causing the computer to perform the data processing method according to one or more embodiments described in this disclosure.

According to one or more embodiments described in this disclosure, some beneficial effects of this application are described as follows.

The data processing method and apparatus and the electronic device disclosed in this application are applied to an electronic device having a plurality of GPUs. In a process of using the plurality of GPUs to perform a deep learning training process, corresponding training data sets are loaded to a plurality of graphics processors GPUs respectively, the plurality of GPUs is controlled to parallely perform training processes according to the corresponding training data sets, so that the GPUs obtain respective modification parameters generated in a training process, and in the process of parallely training according to the corresponding training data sets by the plurality of GPUs, the plurality of GPUs is controlled to perform exchange processing on modification parameters that are in the modification parameters generated through training by the plurality of GPUs and on which exchange has not been performed. The number of modification parameters on which the exchange processing has been completed is greater than 0 when the training is completed. The process of training the training data sets by the plurality of GPUs and the process of exchanging the modification parameters generated through training by the plurality of GPUs can be processed in parallel. Therefore, when the plurality of GPUs completes training on the corresponding training data sets, exchange processing has been performed on some modification parameters. This can shorten a waiting time of the plurality of GPUs, thereby shortening a time consumed for each round of training, shortening a time consumed for completing entire deep learning training, and improving an acceleration ratio of a device.

Aspects of the disclosure provide a data processing method. According to the data processing method, a processor provides different training data sets to a plurality of graphics processing units (GPUs), respectively. The processor controls the plurality of GPUs to generate respective sets of modification parameters by performing respective training processes in a parallel manner using respectively managed versions of a predictive model according to the corresponding training data sets. The processor controls the plurality of GPUs to exchange, before completion of the respective training processes, at least a portion of the sets of modification parameters that have been generated by the plurality of GPUs. The processor also causes the plurality of GPUs to modify the respectively managed versions of the predictive model according to at least the portion of the sets of modification parameters exchanged among the plurality of GPUs.

Aspects of the disclosure provide a data processing apparatus. The data processing apparatus includes processing circuitry configured to provide different training data sets to a plurality of graphics processing units (GPUs), respectively, and to control the plurality of GPUs to generate respective sets of modification parameters by performing respective training processes in a parallel manner using respectively managed versions of a predictive model according to the corresponding training data sets. The processing circuitry is configured to control the plurality of GPUs to exchange, before completion of the respective training processes, at least a portion of the sets of modification parameters that have been generated by the plurality of GPUs. The processing circuitry is further configured to cause the plurality of GPUs to modify the respectively managed versions of the predictive model according to at least the portion of the sets of modification parameters exchanged among the plurality of GPUs.

Aspects of the disclosure provide a non-transitory computer-readable storage medium storing computer-readable instructions, which when executed by a processor, cause the processor to perform at least the following operations. For example, different training data sets are provided to a plurality of graphics processing units (GPUs), respectively. The plurality of GPUs are controlled to generate respective sets of modification parameters by performing respective training processes in a parallel manner using respectively managed versions of a predictive model according to the corresponding training data sets. The plurality of GPUs are controlled to exchange, before completion of the respective training processes, at least a portion of the sets of modification parameters that have been generated by the plurality of GPUs. The plurality of GPUs are caused to modify the respectively managed versions of the predictive model according to at least the portion of the sets of modification parameters exchanged among the plurality of GPUs.

DESCRIPTION OF EMBODIMENTS

Figure 1:
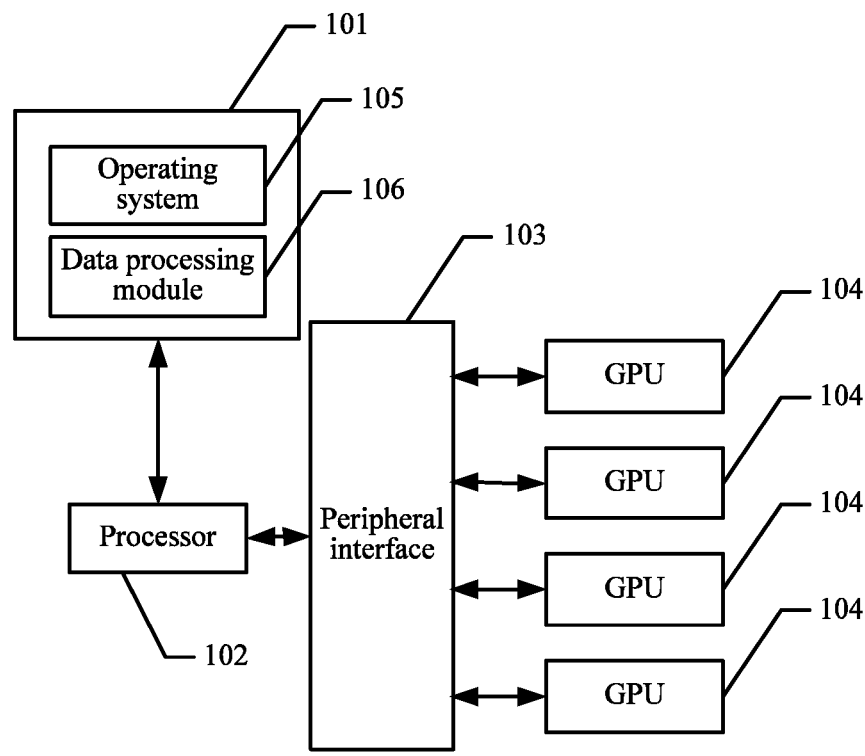
FIG. 1 is a structural block diagram of an electronic device to which a data processing method is applicable according to an embodiment of this application.

In some examples, a deep learning training process performed by a GPU includes two processes: a forward propagation process including sample input and a backpropagation process including data modification. The forward propagation means that an input layer loads input data and propagates the data to each hidden layer for processing, and the data is finally transmitted to an output layer for output. The backpropagation means that a modification parameter is propagated backward layer by layer on hidden layers, and a current model parameter can be modified by using the modification parameter on each hidden layer.

Currently, in a deep learning training process performed by a plurality of GPUs in a parallel processing manner, the entire deep learning training process may include a plurality of rounds of training. In each round of training, a processor provides by loading a respective set (i.e, a batch of a minimum amount of data) of training data (also referred to as a minibatch) to each GPU. For example, a processor can provide by loading Minibatch0, Minibatch1, Minibatch2, and Minibatch3 to GPU0, GPU1, GPU2, and GPU3, respectively. Each GPU can generate a respective set of modification parameters by performing a respective training process according to the respective training data sets using a respectively managed version of a predictive model. After completing the training, each GPU exchanges the sets of modification parameters generated by the GPUs. Then, each GPU uses the modification parameters generated by itself and other GPUs to update model parameters of the version of the predictive model managed by the GPU. Accordingly, after completion of the training processes performed by the GPUs, each GPU has a latest copy of the model parameters of the predictive model. Next round of training to further update the model parameters of the predictive model can be performed after one round of deep learning training is completed.

The applicant finds that, in an existing deep learning training process performed by a plurality of GPUs in a parallel processing manner, after completing each round of training on respective training data sets, the plurality of GPUs needs to exchange modification parameters. Consequently, after completing training, each GPU needs to wait a relatively long time to obtaining modification parameters generated by another GPU, so as to use the modification parameters to update model parameters of a locally managed version of a predictive model. As observed by the Applicant, that exchanging the modification parameters by the plurality of GPUs may consume a relatively long time. In this case, a relatively long time needs to be consumed in each round of training. Consequently, a time of entire deep learning training is increased, and an acceleration ratio of performing deep learning training by a device having a plurality of GPUs is thus reduced.

The following describes the technical solutions in various embodiments of this application with reference to the accompanying drawings. The described embodiments are disclosed as exemplary embodiments of this application rather. All other embodiments obtained by persons skilled in the art based on the embodiments of the present application shall fall within the protection scope of the present application.

A data processing method disclosed in this application is applicable to an electronic device having a plurality of GPUs. The electronic device may be a terminal or a server.

FIG. 1 is a structural block diagram of an electronic device to which a data processing method is applicable according to an embodiment of this application. The electronic device may include a memory 101, one or more processors 102, a peripheral interface 103, and a plurality of GPUs 104. It may be understood that a structure shown in FIG. 1 is only for the purpose of illustration instead of constituting a limitation to the structure of the electronic device. For example, the electronic device 100 may further include more or fewer components than those shown in FIG. 1 or have a configuration different from that shown in FIG. 1.

The memory 101 may be configured to store a to-be-trained data source, a software program and module, for example, an operation the system 105 and a data processing module 106. The operation system 105 may be LINUX, UNIX, WINDOWS or another available operation system. The operation system 105 may include various software and/or drivers used for managing system tasks (for example, memory management, storage device control, and power supply management), and provide a running environment for other software. The data processing module 106 is configured to implement the data processing method according to one or more embodiments described in this application. The memory 101 may include a high-speed random memory, and may also include a non-volatile memory such as one or more magnetic storage devices, a flash memory, or another non-volatile solid-state memory.

The processor 102 may control the software program and module stored in the memory 101 to perform various functional applications and data processing, so as to implement the data processing method according to one or more embodiments of this application. The processor 102 may be a central processing unit (CPU) or an application-specific integrated circuit (ASIC) or may be configured as one or more integrated circuits for implementing the functions of a processor according to one or more embodiments of this application.

Figure 2:
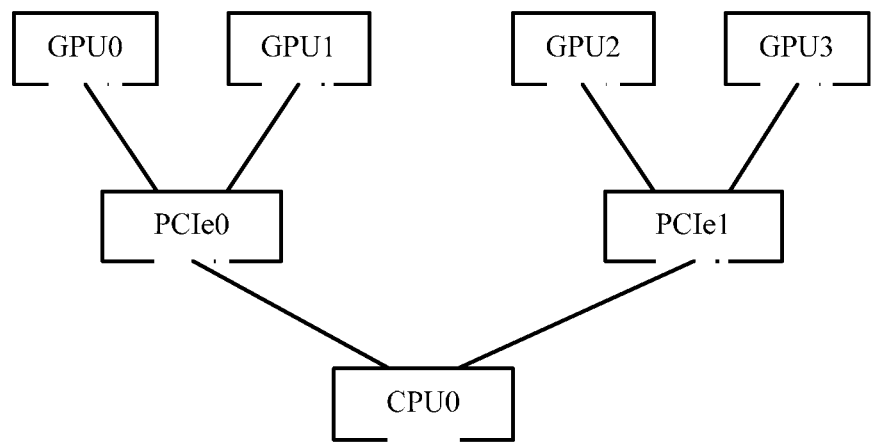
FIG. 2 is a schematic architectural diagram of a relationship between a plurality of GPUs and a processor according to an embodiment of this application.
Figure 3:
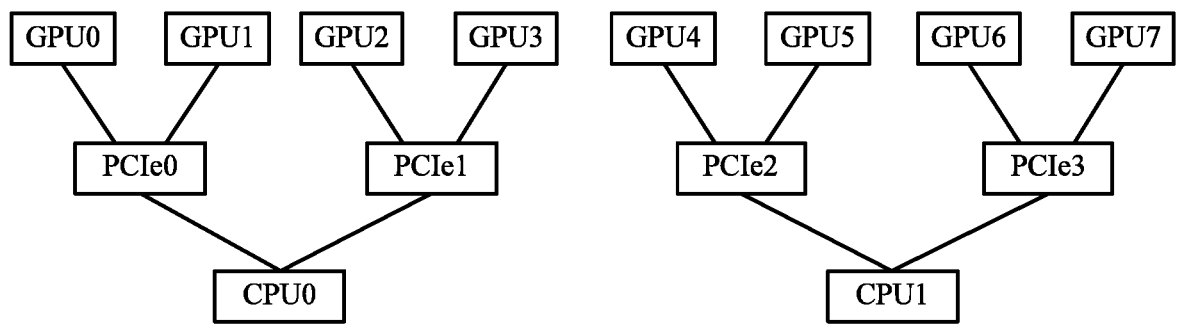
FIG. 3 is a schematic architectural diagram of a relationship between a plurality of GPUs and two processors according to an embodiment of this application.

The peripheral interface 103 is configured to couple various input/input apparatuses to the processor 102. The plurality of GPUs 104 is connected to the processor 102 via the peripheral interface 103. Referring to FIG. 2 and FIG. 3, FIG. 2 is a schematic architectural diagram of a relationship between GPUs and the processor, and FIG. 3 is another schematic architectural diagram of a relationship between GPUs and the processor.

In the architecture shown in FIG. 2, the electronic device includes one processor (which is referred to as CPU0) and four GPUs (which are referred to as GPU0, GPU1, GPU2, and GPU3). GPU0, GPU1, GPU2, and GPU3 are communicatively connected to CPU0 via a peripheral component interconnect express (PCIe), for example, PCIe0.

In the architecture shown in FIG. 3, the electronic device includes two processors (which are referred to as CPU0 and CPU1) and eight GPUs (which are referred to as GPU0, GPU1, GPU2, GPU3, GPU4, GPU5, GPU6, and GPU7). GPU0, GPU1, GPU2, and GPU3 are communicatively connected to CPU0 via PCIe0, and GPU4, GPU5, GPU6, and GPU7 are communicatively connected to CPU1 via PCIe1.

Figure 4:
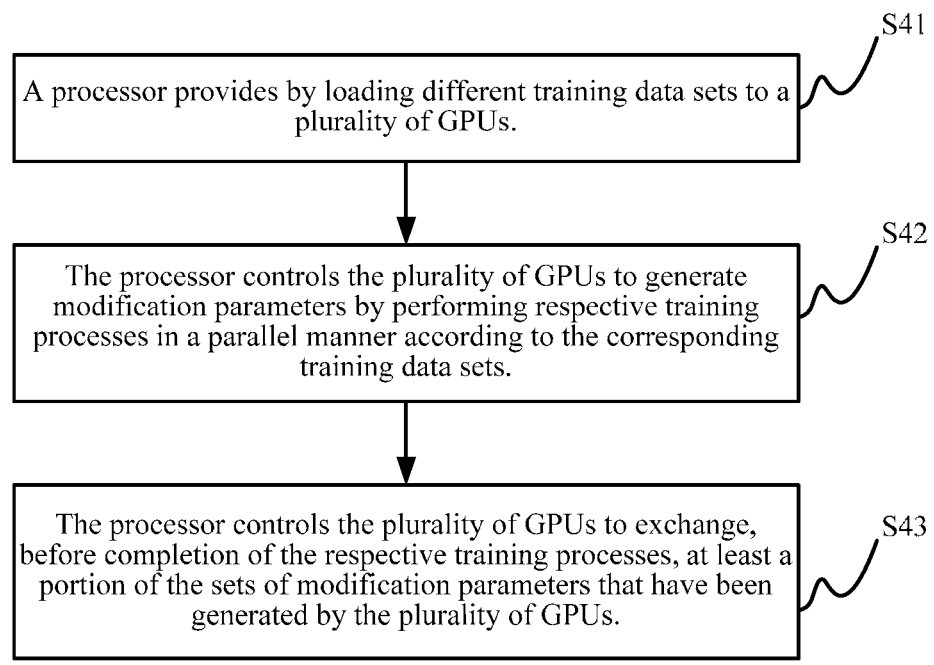
FIG. 4 is a flowchart of a data processing method according to an embodiment of this application.

FIG. 4 is a flowchart of a data processing method according to an embodiment of this application, and is a deep learning training method based on the electronic device shown in FIG. 1. The method may include the following steps.

Step S41: A processor provides by loading corresponding training data sets to a plurality of GPUs, respectively, and different GPUs corresponding to different training data sets.

Step S42: The processor controls the plurality of GPUs to generate respective sets of modification parameters by performing respective training processes in a parallel manner using respectively managed versions of a predictive model according to the corresponding training data sets.

Step S43: The processor controls the plurality of GPUs to exchange, before completion of the respective training processes, at least a portion of the sets of modification parameters that have been generated by the plurality of GPUs. The amount of exchanged modification parameters being greater than 0 when the training processes are completed.

After S43, the processor can cause the plurality of GPUs to modify the respectively managed versions of the predictive model according to at least the portion of the sets of modification parameters exchanged among the plurality of GPUs.

After the deep learning training is started, the one or more processors 102 in the electronic device reads a plurality of training data sets from the to-be-trained data source of the memory 101. In some embodiments, each training data set is a part of the to-be-trained data source. For example, the to-be-trained data source includes 20,000 pictures, and 256 of the 20,000 pictures can be allocated to one training data set. The number of training data sets read by processor 102 is consistent with the number of GPUs connected to the processor 102. Certainly, the number of training data sets obtained by processor 102 in each round is not limited thereto, provided that the number is not less than the number of GPUs 104 connected to the processor 102.

Using the architecture shown in FIG. 2 as an example, CPU0 is connected to four GPUs. In this case, in each round, CPU0 can read four or more training data sets from the memory, and load the four or more training data sets to four GPUs. For example, CPU0 reads four training data sets from the memory 101, which are denoted as Minibatch0, Minibatch1, Minibatch2, and Minibatch3. CPU0 loads Minibatch0 to GPU0, Minibatch1 to GPU1, Minibatch2 to GPU2, and Minibatch3 to GPU3.

Using the architecture shown in FIG. 3 as an example, CPU0 is connected to four GPUs and CPU1 is connected to four GPUs. In this case, in each round, CPU0 and CPU1 each can read four or more training data sets from the memory, for example, four training data sets. The four training data sets read by CPU0 are respectively loaded to GPU0 to GPU3 connected to CPU0, and the four training data sets read by are respectively loaded to GPU4 to GPU7 connected to CPU1. For example, CPU0 reads four training data sets from the memory 101, which are denoted as Minibatch0, Minibatch1, Minibatch2, and Minibatch3, and CPU0 loads Minibatch0 to GPU0, Minibatch1 to GPU1, Minibatch2 to GPU2, and Minibatch3 to GPU3. Also, in this example, CPU1 reads four training data sets from the memory 101, which are denoted as Minibatch4, Minibatch5, Minibatch6, and Minibatch7, and CPU1 loads Minibatch4 to GPU4, Minibatch5 to GPU5, Minibatch6 to GPU6, and Minibatch7 to GPU7.

The processor in the electronic device controls the plurality of GPUs connected to the processor to perform training processes in a parallel manner according to the corresponding training data sets, so that the GPUs obtain respective sets of modification parameters generated through training. In a backpropagation training process performed by the plurality of GPUs on the corresponding training data sets on hidden layers of a predictive model, one or more respective modification parameters can be generated after training on each layer is completed.

Figure 5:
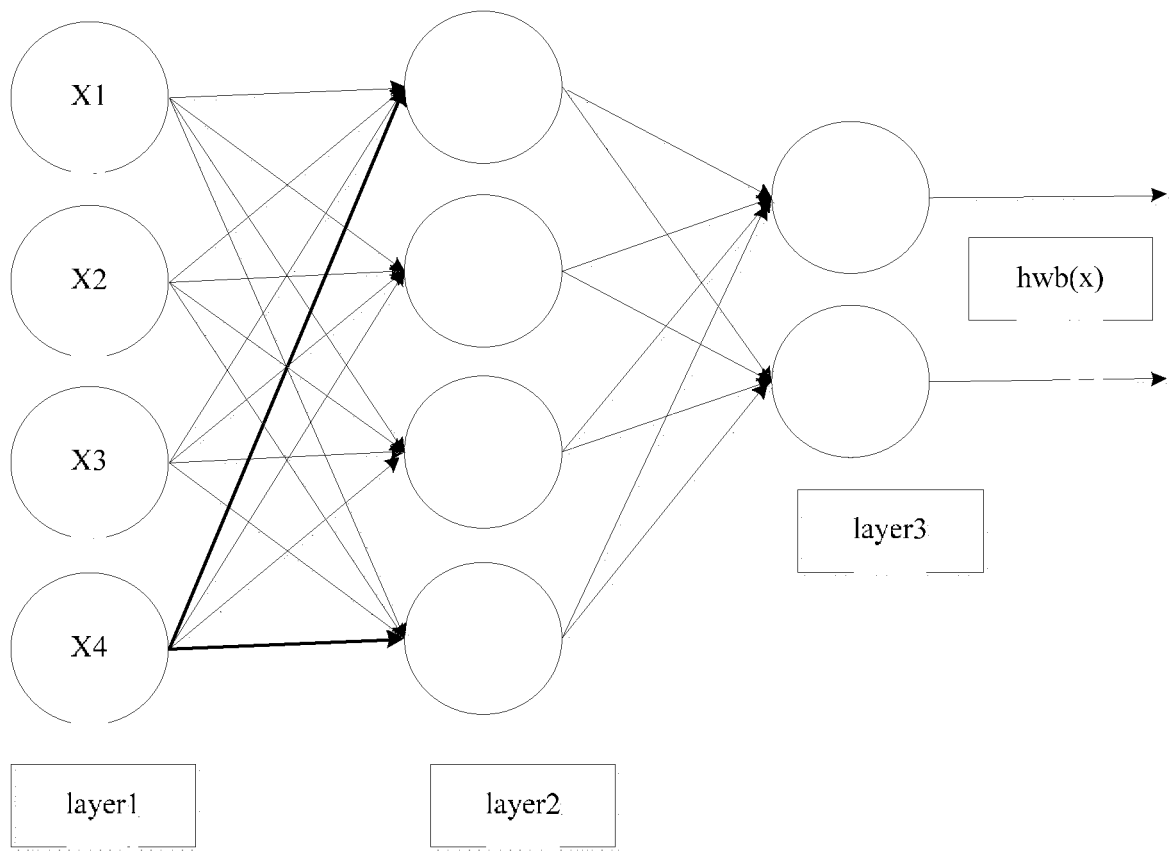
FIG. 5 is a network diagram of deep learning training according to an embodiment of this application.

As shown in FIG. 5, an input layer (layer1) loads input sample data, and propagates the data to each hidden layer (layer2) for processing. Finally, the data is propagated to an output layer (layer3) for output. Training according to one training data set may be implemented by using different types of hidden layers, including, for example, a convolutional layer, a pooling layer, a normalization layer, and a full-connection layer. Different types of hidden layers can be used to implement different functions, and different combinations of hidden layers can also be used to implement different functions.

In a process in which the plurality of GPUs 104 perform training processes in a parallel manner according to the corresponding training data sets, the processor in the electronic device controls the plurality of GPUs 104 to perform exchange processing on modification parameters to exchange the modification parameters that are generated through training by the plurality of GPUs 104 and on which exchange has not been performed. In some embodiments, the modification parameters generated through training by the GPUs 104 include gradient values.

That is, the training processes according to the training data sets performed by the plurality of GPUs and the process of exchanging the modification parameters generated through the training by the plurality of GPUs can be processed in parallel. Therefore, when the plurality of GPUs completes each round of training according to the training data sets, a part of the modification parameters generated by each GPU through training has been exchanged with another GPU. Under optimal conditions, in some embodiments, at a moment at which the plurality of GPUs completes each round of training according to the training data sets, only a last portion of the modification parameters generated on the last hidden layer through training has not been exchanged to another GPU. Therefore, after the plurality of GPUs completes each round of training according to the training data sets, a waiting time can be limited to a time for exchanging modification parameters generated on the last hidden layer through training by the GPUs for the training data sets.

In the process of training according to the corresponding training data sets by the plurality of GPUs, to reduce frequent transmission of modification parameters between the GPUs, the transmission of the modification parameters may be further modified according to certain criteria.

In one example, after the plurality of GPUs completes backpropagation training according to the corresponding training data sets on a preset hidden layer, the plurality of GPUs may be controlled to perform exchange processing on the modification parameters generated through training by the plurality of GPUs, the preset hidden layer being any one or more layers other than the last layer in the hidden layers.

In some embodiments, setting of the preset hidden layer determines when the modification parameters are to be exchanged. The more preset hidden layers are defined for modification parameter exchange, the exchange processes are performed through a training process and thus, the modification parameters can be exchanged in a more timely manner. Accordingly, a shorter waiting time after the plurality of GPUs completes respective training processes according to the respective training data sets. When fewer preset hidden layers are defined for performing exchange processes, a smaller number of transmissions of the modification parameters are performed and more resources are saved. A specific setting of the preset hidden layers for modification parameter exchange may be determined according to an actual situation, and details are not limited herein.

In another example, when a data amount of the modification parameters generated through training by the plurality of GPUs reaches a predetermined data amount, the plurality of GPUs may be controlled to exchange the modification parameters generated through training by the plurality of GPUs, and the predetermined data amount can be less than a data amount of all modification parameters generated in a backpropagation training process performed by the plurality of GPUs according to the corresponding training data sets.

In this example, the modification parameters generated through training by the plurality of GPUs may be stored in cache registers in respective video memories of the plurality of GPUs. In some embodiments, when the cache registers of the plurality of GPUs are full, the plurality of GPUs is controlled to perform exchange processing on respective modification parameters stored in the cache registers, where the predetermined data amount corresponds to a capacity of the cache registers.

In some embodiments, after a GPU transmits a modification parameter in a cache register of the GPU to another GPU, the cache register of the GPU can be cleared. That is, all modification parameters in the cache register of the GPU are modification parameters on which exchange has not been performed. In addition, when a cache register of a GPU is full, the GPU can transmit a modification parameter in the cache register to another GPU via a peripheral interface, regardless of the processing status of the another GPU.

The data processing method disclosed in this application is applied to the electronic device having the plurality of GPUs. In a deep learning training process performed by using the plurality of GPUs, the corresponding training data sets are loaded to the plurality of the graphics processing units GPUs by using the processor. In a process of controlling, by the processor, the plurality of GPUs to perform respective training processes according to the corresponding training data sets, exchange processing is performed on modification parameters that are in the modification parameters generated through training by the plurality of GPUs and on which exchange has not been performed. When the training is completed, exchange processing has been completed for some modification parameters. The process of training the training data sets by the plurality of GPUs and the process of exchanging the modification parameters generated through training by the plurality of GPUs are processed in parallel. Therefore, when the plurality of GPUs completes each round of training according to the corresponding training data sets, exchange processing has been completed for some modification parameters. This can shorten a waiting time of the plurality of GPUs for full exchange all available modification parameters generated during a current round of training, thereby shortening a time consumed for each round of training, shortening a time consumed for completing entire deep learning training, and improving an acceleration ratio of a device.

In an example, the controlling, by the processor 102, the plurality of GPUs 104 to perform exchange processing on the modification parameters generated through training by the plurality of GPUs 104 includes: controlling, by the processor, every two of the plurality of GPUs to perform exchange processing on the modification parameters generated through training by the two GPUs, so that each GPU can obtain a modification parameter generated through training by another GPU. Then, each GPU uses a modification parameter generated by the GPU and the modification parameter obtained from the another GPU to modify a current model parameter of a locally managed version of the predictive model.

Referring to the architecture shown in FIG. 2, an example of the communicative relationship among various components for exchanging modification parameters is illustrated as follows.

GPU0 and GPU1 establish a point-to-point connection, GPU0 transmits a modification parameter generated through training by GPU0 to GPU1, and GPU1 transmits a modification parameter generated through training by GPU1 to GPU0.

GPU0 and GPU2 establish a point-to-point connection, GPU0 transmits the modification parameter generated through training by GPU0 to GPU2, and GPU2 transmits a modification parameter generated through training by GPU2 to GPU0.

GPU0 and GPU3 establish a point-to-point connection, GPU0 transmits the modification parameter generated through training by GPU0 to GPU3, and GPU3 transmits a modification parameter generated through training by GPU3 to GPU0.

GPU1 and GPU2 establish a point-to-point connection, GPU1 transmits the modification parameter generated through training by GPU1 to GPU2, and GPU2 transmits the modification parameter generated through training by GPU2 to GPU1.

GPU1 and GPU3 establish a point-to-point connection, GPU1 transmits the modification parameter generated through training by GPU1 to GPU3, and GPU3 transmits the modification parameter generated through training by GPU3 to GPU1.

GPU2 and GPU3 establish a point-to-point connection, GPU2 transmits the modification parameter generated through training by GPU2 to GPU3, and GPU3 transmits the modification parameter generated through training by GPU3 to GPU2.

In this way, all of GPU0 to GPU3 obtain the modification parameters generated through training by the other GPUs. Each GPU uses the modification parameters generated through training by the GPU and the modification parameters generated through training by the other GPUs to modify the current model parameters of a locally managed version of the predictive model. After the modification is completed, next round of training in the entire deep learning training can be performed.

In the process of training according to the corresponding training data sets by the plurality of GPUs, to reduce frequent transmission of modification parameters between the GPUs, the transmission of the modification parameters may be further modified.

In one example, after the plurality of GPUs completes backpropagation training according to the corresponding training data sets on a preset hidden layer, the plurality of GPUs may be controlled to perform exchange processing on the modification parameters generated through training by the plurality of GPUs, the preset hidden layer is a layer other than the last layer in the hidden layers.

In some embodiments, setting of the preset hidden layer determines when the modification parameters are to be exchanged. The more preset hidden layers that are defined for modification parameter exchange, the more exchange processes that are performed through a training process and thus the modification parameters can be exchanged in a more timely manner. Accordingly, a shorter waiting time after the plurality of GPUs completes respective training processes according to the respective training data sets. When fewer preset hidden layers are defined for performing exchange processes, a smaller number of transmissions of the modification parameters are performed and more resources are saved. Specific setting of the preset hidden layers for modification parameter exchange may be determined according to an actual situation, and details are not limited herein.

In another example, when a data amount of the modification parameters generated through training by the plurality of GPUs reaches a predetermined data amount, the plurality of GPUs may be controlled to exchange the modification parameters generated through training by the plurality of GPUs, and the predetermined data amount can be less than a data amount of all modification parameters generated in a backpropagation training process performed by the plurality of GPUs according to the corresponding training data sets.

In this example, the modification parameters generated through training by the plurality of GPUs may be stored in cache registers in respective video memories of the plurality of GPUs. In some embodiments, when the cache registers of the plurality of GPUs are full, the plurality of GPUs is controlled to perform exchange processing on respective modification parameters stored in the cache registers, where the predetermined data amount corresponds to a capacity of the cache registers.

In some embodiments, after a GPU transmits a modification parameter in a cache register of the GPU to another GPU, the cache register of the GPU can be cleared. That is, all modification parameters in the cache register of the GPU are modification parameters on which exchange has not been performed. In addition, when a cache register of a GPU is full, the GPU can transmit modification parameters in the cache register to another GPU via a peripheral interface, regardless of the processing status of the another GPU.

Figure 6:
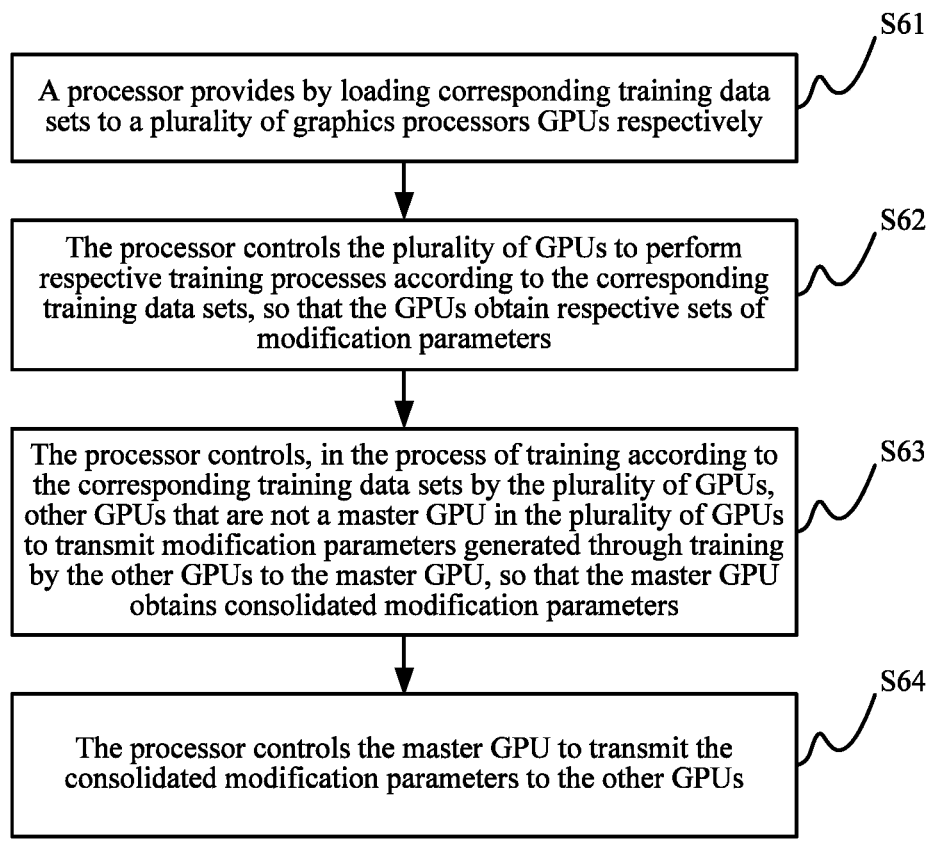
FIG. 6 is a flowchart of a data processing method according to an embodiment of this application.

FIG. 6 is a flowchart of a data processing method disclosed in this application. In an electronic device, one of a plurality of GPUs is used as a master GPU. The data processing method includes the following steps.

Step S61: A processor provides by loading corresponding training data sets to the plurality of graphics processors GPUs respectively, different GPUs corresponding to different training data sets.

Step S62: The processor controls the plurality of GPUs 104 to perform respective training processes according to the corresponding training data sets, so that the GPUs obtain respective sets of modification parameters generated in the respective training processes.

Step S63: The processor controls, in the process of training according to the corresponding training data sets by the plurality of GPUs, other GPUs that are not the master GPU in the plurality of GPUs to transmit modification parameters generated through training by the other GPUs to the master GPU, so that the master GPU obtains consolidated modification parameters.

Step S64: The processor controls the master GPU to transmit the consolidated modification parameters to the other GPUs.

That is, one of the plurality of GPUs of the electronic device is used as the master GPU, and the other GPUs transmit, to the master GPU, modification parameters that are in the modification parameters generated through training by the other GPUs and on which exchange has not been performed. The master GPU may, for example, consolidated modification parameters generated through training by the master GPU and the modification parameters generated through training by the other GPUs, to obtain the consolidates modification parameters, and transmits the consolidates modification parameters to the other GPUs.

After receiving the consolidate modification parameters, the other GPUs can use the consolidated modification parameters to modify a model parameters of respectively managed versions of the predictive model used for training, to obtain modified model parameters when the training is still in progress. Alternatively, in some embodiments, after each GPU completes training according to the corresponding training data sets, the other GPUs can use the consolidated modification parameters to modify current model parameters of respectively managed versions of the predictive model.

According to the data processing method shown in FIG. 6 in this application, the processor controls the plurality of GPUs to train in parallel according to the corresponding training data sets, and through controlling of the processor, the master GPU in the plurality of GPUs can obtain new modification parameters that are generated through training by the other GPUs and that have not been transmitted to the master GPU. After completing training on a current training data set and obtaining the modification parameters generated through training by the other GPUs for the current training data set, the master GPU may, for example, consolidate the modification parameters generated by the master GPU and the received modification parameters sent by each GPU other than the master GPU in the plurality of GPUs, and transmits the consolidate modification parameters to the other GPUs, so that the other GPUs can modify the current model parameter of respectively managed versions of a predictive model based on the consolidate modification parameters.

In some embodiments, in the data processing method shown in FIG. 4 and FIG. 6, the modification parameters may be applied to a case in which different GPUs may have different model parameters, and are used by each GPU to modify a model parameter of a version of the same predictive model that is managed by the GPU.

In some embodiments, the process of training according to the training data sets by the plurality of GPUs and the process of exchanging the modification parameters generated through training by the plurality of GPUs can be processed in parallel. An exemplary process of exchanging the modification parameters by the plurality of GPUs can include that the other GPUs that are not the master GPU in the plurality of GPUs transmits the modification parameters to the master GPU. As such, the number of exchanges of the modification parameters and a data exchange amount can be reduced. Therefore, after the plurality of GPUs completes each round of training according to the training data sets, the master GPU only needs to wait a relatively short time to obtain all modification parameters required for modifying the current model parameters, and consolidates the modification parameters. This can further shorten a time consumed for each round of training and improve an acceleration ratio of a device.

In one embodiment, when the electronic device includes one processor, the plurality of GPUs is connected to the processor via a peripheral interface, such as the architecture shown in FIG. 2 for example. One of the plurality of GPUs is used as the master GPU, and the other GPUs are used as slave GPUs.

For example, if GPU0 is used as the master GPU, and GPU1, GPU2, and GPU3 are used as slave GPUs.

In a round of training, CPU0 reads four training data sets from a memory, which are denoted as Minibatch0, Minibatch1, Minibatch2, and Minibatch3. CPU0 loads Minibatch0 to GPU0, Minibatch1 to GPU1, Minibatch2 to GPU2, and Minibatch3 to GPU3.

CPU0 controls GPU0, GPU1, GPU2, and GPU3 to perform respective training processes in parallel according to the corresponding training data sets, and controls GPU1, GPU2, and GPU3 to transmit, to GPU0 in a training process to exchange modification parameters generated through training and on which exchange has not been performed.

When GPU0, GPU1, GPU2, and GPU3 completes training according to respective training data sets, GPU1, GPU2, and GPU3 have transmitted some modification parameters generated through training to GPU0. In some embodiments, only modification parameters generated by GPU1, GPU2, and GPU3 corresponding to training on the last layer have not been transmitted to GPU0. Therefore, GPU0 only needs to wait a relatively short time to obtain the modification parameters generated through training performed by GPU1, GPU2, and GPU3 for the last layer according to the respective training data sets. GPU0 consolidates modification parameters generated by GPU0 and the modification parameters obtained from the other three GPUs, and transmits consolidates modification parameters to the other three GPUs, so that GPU1 to GPU3 can modify the current model parameters of respectively managed versions of a predictive model based on the consolidates modification parameter. In next round of training, all of GPU0 to GPU3 use the modified model parameters to perform training.

Figure 7:
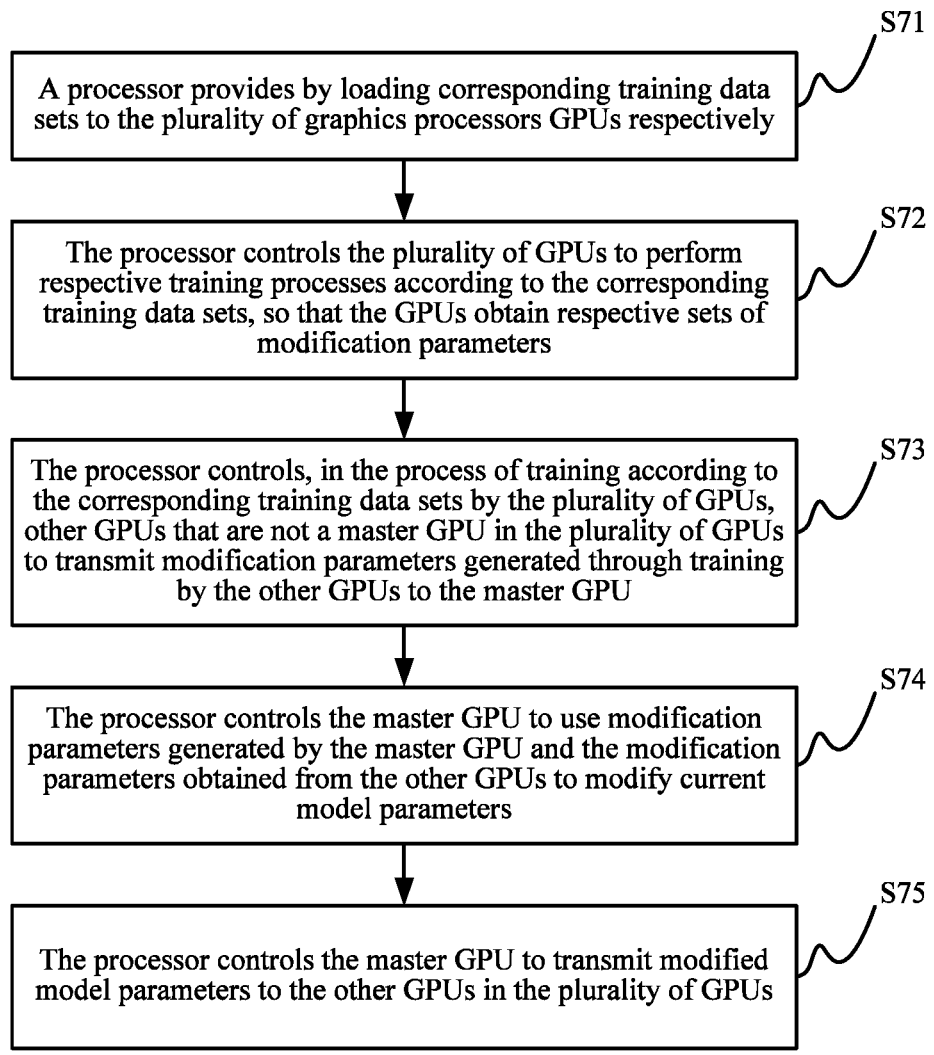
FIG. 7 is a flowchart of a data processing method according to an embodiment of this application.

Referring to FIG. 7, FIG. 7 is a flowchart of a data processing method disclosed in this application. In an electronic device, one of a plurality of GPUs is used as a master GPU. The data processing method includes the following steps.

Step S71: A processor provides by loading corresponding training data sets to the plurality of graphics processors GPUs respectively, different GPUs corresponding to different training data sets.

Step S72: The processor controls the plurality of GPUs 104 to perform respective training processes according to the corresponding training data sets, so that the GPUs obtain respective sets of modification parameters generated in the respective training processes.

Step S73: The processor controls, in the process of training according to the corresponding training data sets by the plurality of GPUs, other GPUs that are not the master GPU in the plurality of GPUs to transmit modification parameters generated through training by the other GPUs to the master GPU.

Step S74: The processor controls the master GPU to use modification parameters generated by the master GPU and the modification parameters obtained from the other GPUs to modify current model parameters of a version of a predictive model managed by the master GPU.

Step S75: The processor controls the master GPU to transmit the modified model parameters of the version of the predictive model managed by the master GPU to the other GPUs in the plurality of GPUs.

That is, one of the plurality of GPUs of the electronic device is used as the master GPU, and the other GPUs transmit, to the master GPU, modification parameters that are generated through training by the other GPUs and on which exchange has not been performed. After each GPU completes training according to the corresponding training data sets, the master GPU uses the modification parameters generated through training by the master GPU and the modification parameters obtained from the other GPUs to modify the current model parameters of a version of a predictive model managed by the master GPU. Then, the master GPU transmits modified model parameters of the version of the predictive model managed by the master GPU to the other GPUs, so that the other GPUs obtain the modified model parameters. The GPUs (including the master GPU) performs subsequent training based on the modified model parameters.

According to the data processing method shown in FIG. 7 in this application, the processor controls the plurality of GPUs to perform respective training processes according to the corresponding training data sets. Through controlling of the processor, the master GPU in the plurality of GPUs can obtain new modification parameters that are generated through training by the other GPUs and that have not been transmitted to the master GPU. After completing training according to a current training data set and obtaining the modification parameters generated through training by the other GPUs for the corresponding training data sets, the master GPU modifies the current model parameters of a version of a predictive model managed by the master GPU based on the modification parameters generated by the master GPU and the modification parameters obtained from the other GPUs, and then transmits the modified model parameters of the version of the predictive model managed by the master GPU to the other GPUs.

In some embodiments, the process of training according to the training data sets by the plurality of GPUs and the process of exchanging the modification parameters generated through training by the plurality of GPUs can be processed in parallel. An exemplary process of exchanging the modification parameters by the plurality of GPUs can include that the other GPUs that are not the master GPU in the plurality of GPUs transmits the modification parameters to the master GPU. As such, the number of exchanges of the modification parameters and a data exchange amount can be reduced. Therefore, after the plurality of GPUs completes training according to the training data sets, the master GPU only needs to wait a relatively short time to obtain all modification parameters required for modifying the current model parameters. This can further shorten a time consumed for each round of training and improve an acceleration ratio of a device. In addition, only one GPU (that is, the master GPU) in the plurality of GPUs needs to modify the model parameters based on the modification parameters, and the other GPUs do not need to perform the model modification operation, hence reducing workloads of the other GPUs.

In one embodiment, when the electronic device includes one processor, the plurality of GPUs is connected to the processor via a peripheral interface. One of the plurality of GPUs is used as the master GPU, and the other GPUs are used as slave GPUs.

For example, in the architecture shown in FIG. 2, if GPU0 is used as the master GPU, GPU1, GPU2, and GPU3 are used as slave GPUs.

In a particular round of training, CPU0 reads four training data sets from a memory, which are denoted as Minibatch0, Minibatch1, Minibatch2, and Minibatch3. CPU0 loads Minibatch0 to GPU0, Minibatch1 to GPU1, Minibatch2 to GPU2, and Minibatch3 to GPU3.

CPU0 controls GPU0, GPU1, GPU2, and GPU3 to perform respective training processes in a parallel manner according to the corresponding training data sets, and controls GPU1, GPU2, and GPU3 to transmit, to GPU0 in a training process, modification parameters that are generated through training and on which exchange has not been performed.

When GPU0, GPU1, GPU2, and GPU3 completes training according to respective training data sets, GPU1, GPU2, and GPU3 have transmitted some modification parameters generated through training to GPU0. In some embodiments, only modification parameters generated by GPU1, GPU2, and GPU3 corresponding to training on the last layer have not been transmitted to GPU0. Therefore, GPU0 only needs to wait a relatively short time to obtain the modification parameters generated through training performed by GPU1, GPU2, and GPU3 for the last layer according to the respective training data sets. GPU0 modifies current model parameters managed by GPU0 by using modification parameters generated by GPU0 and the modification parameters obtained from the other three GPUs, and transmits modified model parameters to the other three GPUs. In next round of training, all of GPU0 to GPU3 use the received modified model parameters to perform training.

In one embodiment, during the training processes performed in parallel according to the corresponding training data sets by the plurality of GPUs, if the slave GPUs transmit the modification parameters to the master GPU at an excessively high frequent, communications buses will be frequently occupied.

In an alternative implementation, after a plurality of slave GPUs completes backpropagation training according to the corresponding training data sets on a preset hidden layer, the plurality of slave GPUs may be controlled to transmit the modification parameters generated through training by the plurality of GPUs to the master GPU, and the preset hidden layer is a layer other than the last layer in the hidden layers.

In one embodiment, after the processor controls each slave GPU to complete backpropagation training on the preset hidden layer, modification parameters that have not been exchanged are transmitted to the master GPU via the peripheral interface, thereby avoiding a problem that the slave GPUs frequently occupy the communications buses. In some embodiments, setting of the preset hidden layer determines when the modification parameters are to be exchanged. The more preset hidden layers that are defined for modification parameter exchange, the more exchange processes that are performed through a training process and thus, the modification parameters can be exchanged in a more timely manner. Accordingly, a shorter waiting time after the plurality of GPUs completes respective training processes according to the respective training data sets. When fewer preset hidden layers are defined for performing exchange processes, a smaller number of transmissions of the modification parameters are performed and more resources are saved. Specific setting of the preset hidden layers for modification parameter exchange may be determined according to an actual situation, and details are not limited herein.

Figure 8:
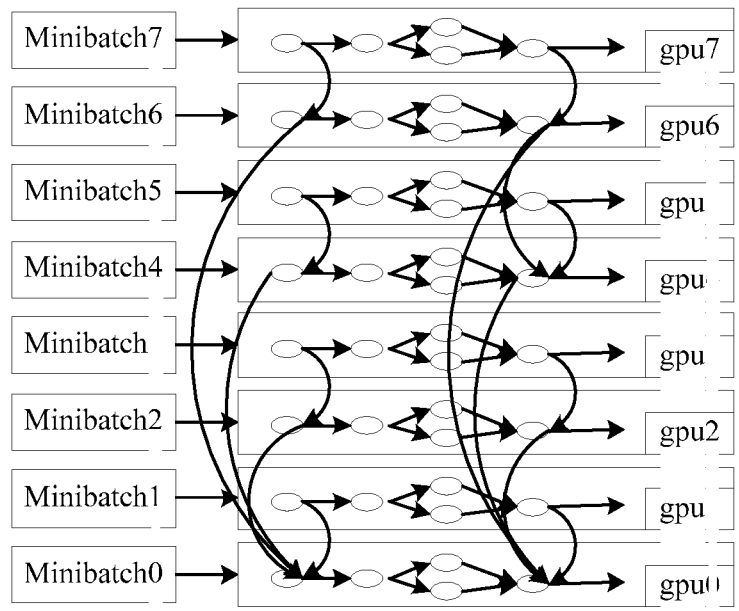
FIG. 8 is a network diagram of a layer structure in a deep learning training process performed on training data sets according to an embodiment of this application.

Using FIG. 8 as an example, the first layer is used as the preset hidden layer. After controlling GPU1, GPU2, and GPU3 to complete training on the first layer, the processor may transmit, to GPU0 via the peripheral interface, the modification parameters that have not been exchanged. After controlling GPU1, GPU2, and GPU3 to complete training on the fourth layer (one round of training ends), the processor transmits, to GPU0 via the peripheral interface, the modification parameters that have not been exchanged.

In addition, a data amount of the modification parameters that have not been exchanged by each slave GPU may be used as a basis for determining whether to control the slave GPU to transmit the modification parameters to the master GPU. That is, the processor controls, when the modification parameters that have not been exchanged reaches a predetermined data amount, each slave GPU to transmit the modification parameters generated through training to the master GPU via the peripheral interface. The predetermined data amount is less than a data amount of all modification parameters generated when the plurality of GPUs performs a backpropagation training process according to the corresponding training data sets. The predetermined data amount may be determined based on a data amount of modification data generated by all the GPUs, or may be determined based on the data amount that is generated by the slave GPU and on which exchange has not been performed, thereby avoiding a problem that the slave GPUs frequently occupy the communications buses.

In some embodiments, after a slave GPU completes training on the preset hidden layer, or when a data amount of modification parameters that are of a slave GPU and on which exchange has not been performed reaches a predetermined data amount, modification parameters that have not been exchanged may be transmitted to the master GPU via the peripheral interface, regardless of the processing status of other slave GPUs. That is, processes of transmitting the modification parameters by the plurality of slave GPUs to the master GPU are asynchronous communication processes.

In some embodiments, each slave GPU stores modification parameters generated through training to a cache register of a respective video memory. In some embodiments, when respective cache registers of the plurality of GPUs are full, the plurality of GPUs are controlled to transmit modification parameters in the respective cache registers to the master GPU, where the predetermined data amount corresponds to a capacity of the cache registers.

In some embodiments, after the slave GPU transmits modification parameters in a cache register of the slave GPU to the master GPU, the cache register of the slave GPU can be cleared. That is, all modification parameters in the cache register of the slave GPU are modification parameters on which exchange has not been performed. In addition, when a cache register of a slave GPU is full, the slave GPU can transmit modification parameters in the cache register to the master GPU via a peripheral interface, regardless of the processing status of the master GPU.

In one embodiment, when the electronic device includes a plurality of processors, each processor is connected to a working group via a peripheral interface. Each working group includes a plurality of GPUs, such as the architecture shown in FIG. 3. One of the plurality of working groups is used as a master working group, and other working groups are used as slave working groups. In addition, one GPU in the master working group is used as the master GPU, one GPU in each of the slave working groups is used as a secondary GPU, and other GPUs in the plurality of working groups are slave GPUs.

In this case, in the data processing method shown in FIG. 7, the controlling other GPUs than the master GPU in the plurality of GPUs to transmit modification parameters generated through training by the other GPUs to the master GPU can include controlling each slave GPU in the master working group to transmit modification parameters generated through training by the slave GPU to the master GPU; controlling each slave GPU in each slave working group to transmit modification parameters generated through training by the slave GPU to a secondary GPU in the slave working group in which the slave GPU is located; and controlling the secondary GPU in the slave working group to transmit modification parameters generated through training by the secondary GPU and the modification parameters obtained from each slave GPU in the slave working group to the master GPU. The controlling the master GPU to transmit the modified model parameters to the other GPUs can include controlling the master GPU to transmit the modified model parameters to the slave GPU in the master working group; and controlling the master GPU to transmit the modified model parameters to each secondary GPU, and controlling each secondary GPU to transmit the modified model parameters to a slave GPU in a slave working group in which the secondary GPU is located.

The electronic device includes a plurality of processors, each processor is connected to one working group, and each working group includes a plurality of GPUs. GPUs associated with a same processor may directly perform data exchange, but two GPUs associated with different processors may need to perform inter-processor data exchange. The inter-processor data exchange has a relatively slow data exchange speed. As such, if there is an excessively large number of inter-processor data exchanges, a relatively large communication bandwidth may be occupied for a long time. Therefore, when the electronic device has the plurality of processors, one of the plurality of working groups is used as the master working group, other working groups are used as slave working groups, one GPU in the master working group is used as the master GPU, one GPU in each of the slave working groups is used as the secondary GPU, and other GPUs in each working group are used as slave GPUs.

For the slave GPUs in the master working group, the processor controls each slave GPU to transmit modification parameters on which exchange has not been performed to the master GPU via the peripheral interface. For the slave GPUs in the slave working group, the processor controls each slave GPU to transmit modification parameters on which exchange has not been performed to a secondary GPU in a slave working group in which the slave GPU is located, and then the secondary GPU transmits, to the master GPU, modification parameters generated by the secondary GPU and the received modification parameter transmitted by each slave GPU.

In some embodiments, the processor controls the master GPU to transmit modified model parameters to each slave GPU via the peripheral interface. The processor controls the master GPU to transmit the modified model parameters to each secondary GPU, and then the secondary GPU transmits the modified model parameters to a slave GPU in a slave working group in which the secondary GPU is located.

That is, in each slave working group, only the secondary GPU performs inter-processor data exchange with the master GPU, thereby reducing the number of inter-processor data exchanges, and further reducing an occupied communication bandwidth.

Using the architecture shown in FIG. 3 as an example, GPU0, GPU1, GPU2, and GPU3 belong to a first working group, GPU4, GPU5, GPU6, and GPU7 belong to a second working group, the first working group is used as the master working group, the second working group is used as a slave working group, GPU0 is used as the master GPU, GPU4 is used as the secondary GPU, and other GPUs are used as slave GPUs.

In a particular round of training, CPU0 and CPU1 separately read four training data sets from the memory, and load the training data sets to GPU0 to GPU7 respectively.

CPU0 controls GPU0 to GPU3 to performing respective training processes according to the corresponding training data sets. During the training processes, CPU0 controls GPU1 to GPU3 to transmit modification parameters on which exchange has not been performed to GPU0 via a peripheral interface.

CPU1 controls GPU4 to GPU7 to performing respective training processes according to the corresponding training data sets. During the training processes, CPU1 controls GPU5 to GPU7 to transmit modification parameters on which exchange has not been performed to GPU4 via a peripheral interface. CPU1 controls GPU4 to transmit modification parameters generated by GPU4 and the modification parameters received from GPU5 to GPU7 to GPU0.

GPU0 uses modification parameters generated by GPU0, the modification parameters transmitted by GPU1 to GPU3, and the modification parameters transmitted by GPU4 to modify current model parameters of a version of a predictive model managed by GPU0. GPU0 transmits modified model parameters of the version of the predictive model managed by GPU0 to GPU1 to GPU3 via the peripheral interface, and transmits the modified model parameters to GPU4. After receiving the modified model parameters, GPU4 transmits the modified model parameters to GPU5 to GPU7.

In one embodiment, the controlling the secondary GPU in the slave working group to transmit modification parameters generated through training by the secondary GPU and the modification parameters obtained from each slave GPU in the slave working group to the master GPU can include controlling the secondary GPU in the slave working group to preprocess the modification parameters generated through training by the secondary GPU and the modification parameters obtained from each slave GPU in the slave working group, to obtain preprocessed modification parameters, and controlling the secondary GPU to transmit the preprocessed modification parameters to the master GPU, where a data amount of the preprocessed modification parameters is less than a data amount of the modification parameters before preprocessing.

In one embodiment, the controlling the secondary GPU in the slave working group to preprocess the modification parameters generated through training by the secondary GPU and the modification parameters obtained from each slave GPU in the slave working group, to obtain preprocessed modification parameters, and controlling the secondary GPU to transmit the preprocessed modification parameters to the master GPU can include controlling the secondary GPU in the slave working group to generate an added value of one of the modification parameters generated through training by the secondary GPU and a corresponding one of the modification parameters obtained from each slave GPU in the slave working group, and to transmit the added value as a preprocessed modification parameter to the master GPU.

In another embodiment, the controlling the secondary GPU in the slave working group to preprocess the modification parameters generated through training by the secondary GPU and the modification parameters obtained from each slave GPU in the slave working group, and to transmit preprocessed modification parameters to the master GPU can include controlling the secondary GPU in the slave working group to calculate an average value of one of the modification parameters generated through training by the secondary GPU and a corresponding one of the modification parameters obtained from each slave GPU in the slave working group, and to transmit the calculated average value of the modification parameters as a preprocessed modification parameter to the master GPU.

Using the architecture shown in FIG. 3 as an example, it is assumed that a modification parameter generated through training by GPU0 is 1.1, and the corresponding modification parameters generated through training by GPU1 to GPU7 are 1.2, 1.17, 1.3, 1.05, 1.22, 1.33, and 1.14.

According to a first approach described above, GPU4, used as the secondary GPU, adds the modification parameter (1.05) generated through training by GPU4 and the modification parameters (1.22, 1.33, and 1.14) obtained from GPU5 to GPU7, and transmits a modification parameter 4.74 obtained through addition to GPU0.

According to the first approach, GPU0 calculates an average value of the modification parameter (1.1) generated through training by GPU0, the modification parameters (1.2, 1.17, and 1.3) obtained from GPU1 to GPU3, and the modified modification parameter (4.74) transmitted by GPU4 as (1.1+1.2+1.17+1.3+4.74)/8, and uses the average value to modify the current model parameter.

According to a second approach described above, GPU4, used as the secondary GPU, calculates an average value of the modification parameter (1.05) generated through training by GPU4 and the modification parameters (1.22, 1.33, and 1.14) obtained from GPU5 to GPU7, and transmits the calculated average value 1.185 GPU0.

According to the second approach, GPU0 calculates a first average value of the modification parameter (1.1) generated through training by GPU0 and the modification parameters (1.2, 1.17, and 1.3) obtained from GPU1 to GPU3 as 1.1925, calculates an average value of the first average value and the modified modification parameter (1.185) obtained from GPU4 as (1.1925+1.185)/2, and uses the average value to modify the current model parameter.

In some embodiments, to reduce the number of transmissions of the modification parameters to the master GPU, the following manners may be used.

In one example, the controlling each slave GPU in each slave working group to transmit a modification parameter generated through training by the slave GPU to a secondary GPU in the slave working group in which the slave GPU is located can include, after training is completed on a preset hidden layer, controlling each slave GPU in the slave working group to transmit the modification parameter generated through training to the secondary GPU in the slave working group in which the slave GPU is located, the preset hidden layer being a layer other than the last layer in the hidden layers. In one example, the controlling each slave GPU in each slave working group to transmit a modification parameter generated through training by the slave GPU to a secondary GPU in the slave working group in which the slave GPU is located can include, when the modification parameters on which exchange has not been performed reaches the predetermined data amount, controlling each slave GPU in the slave working group to transmit the modification parameter generated through training to the secondary GPU in the slave working group in which the slave GPU is located, the predetermined data amount being less than a data amount of all modification parameters generated when the plurality of GPUs performs a backpropagation training process according to the corresponding training data sets.

In one example, the controlling each slave GPU in the master working group to transmit a modification parameter generated through training by the slave GPU to the master GPU can include, after training is completed on the preset hidden layer, controlling each slave GPU in the master working group to transmit the modification parameter generated through training to the master GPU, the preset hidden layer being a layer other than the last layer in the hidden layers. In one example, the controlling each slave GPU in the master working group to transmit a modification parameter generated through training by the slave GPU to the master GPU can include, when the modification parameters on which exchange has not been performed reaches the predetermined data amount, controlling each slave GPU in the master working group to transmit the modification parameter generated through training to the master GPU, the predetermined data amount being less than a data amount of all modification parameters generated when the plurality of GPUs performs a backpropagation training process according to the corresponding training data sets.

In some embodiments, the predetermined data amount may be determined based on a data amount of modification data generated by all the GPUs, or may be determined based on the data amount that is generated by the slave GPU and on which exchange has not been performed, thereby avoiding a problem that the slave GPUs frequently occupy the communications buses. After a slave GPU completes training on the preset hidden layer, or when a data amount of modification parameters that are of a slave GPU and on which exchange has not been performed reaches a predetermined data amount determined based on a data amount that is generated by the slave GPU and on which exchange has not been performed, transmission of modification parameters can be started, regardless of the processing status of other slave GPUs.

In some embodiments, each slave GPU stores modification parameters generated through training to a cache register of a respective video memory. In some embodiments, when a cache register of the slave GPU in the slave working group is full, the slave GPU in the slave working group can be controlled to transmit the modification parameters in the cache register to the secondary GPU in the slave working group in which the slave GPU is located.

In some embodiments, the controlling each slave GPU in the master working group to transmit modification parameters generated through training by the slave GPU to the master GPU can include controlling, when a cache register of the slave GPU in the master working group is full, the slave GPU in the master working group to transmit the modification parameters in the cache register to the master GPU.

For ease of understanding, based on the foregoing embodiments, the following describes specific application scenarios as examples. FIG. 8 is a network diagram of a layer structure in a deep learning training process performed on training data sets.

In this example, training data sets are loaded to the plurality of graphics processors GPUs respectively. Using NVIDIA™ K80 GPU and NVIDIA™ M40 GPU as an example, each GPU processes 256 pictures, where GPU0 and GPU1 are located in a master working group, GPU2 and GPU3 are located in a first slave working group, GPU4 and GPU5 are located in a second slave working group, GPU6 and GPU7 are located in a third slave working group, and Minibatch0, Minibatch1, Minibatch2, Minibatch3, Minibatch4, Minibatch5, Minibatch6, and Minibatch7 are loaded to the corresponding GPUs, respectively.

The plurality of GPUs is controlled to perform backpropagation training in parallel according to the corresponding training data sets on hidden layers of a predictive model, so that the GPUs obtain respective modification parameters generated in respective training processes.

In one example, GPU0 and GPU1 are used as an example for illustrating how two GPUs perform deep learning training in parallel according to corresponding training data sets. Assuming that the first layer is a preset hidden layer, after training is completed on the first layer, GPU1 transmits modification parameters generated through training by GPU1 to GPU0. After training is completed on the fourth layer, GPU1 transmits modification parameters generated through training by GPU1 to GPU0. GPU0 modifies model parameters of a version of the predictive model managed by GPU0 based on the modification parameters that correspond to the number of layers and that are generated by GPU0 and the received modification parameters that correspond to the layers and that are transmitted by GPU1, and transmits the modified model parameters to GPU1, so that each GPU performs next round of training based on the updated model parameters.

In one example, GPU0, GPU1, GPU2, and GPU3 are used as an example for illustrating how four GPUs perform deep learning training in parallel according to corresponding training data sets, where a master working group includes GPU0 and GPU1, and a first slave working group includes GPU2 and GPU3. After training is completed on the first layer, GPU1 transmits modification parameters generated through training by GPU1 to GPU0, GPU3 transmits modification parameters generated through training by GPU3 to GPU2, and GPU2 transmits, to GPU0, modification parameters generated through training by GPU2 and the received modification parameters that are generated by the GPUs and on which exchange has not been performed. After training is completed on the fourth layer, GPU1 and GPU3 transmits respective modification parameters generated through training by GPU1 and GPU3 to GPU0 and GPU2, and GPU2 transmits, to GPU0, modification parameters generated through training by GPU2 and the received modification parameters that are generated by the GPUs and on which exchange has not been performed. GPU0 modifies model parameters of a version of a predictive model managed by GPU0 based on the modification parameters that correspond to the number of layers and that are generated by GPU0 and the received modification parameters that correspond to the layers, and transmits the modified model parameters to GPU1 and GPU2 that is used as a secondary GPU. GPU2 transmits the received modified model parameters to GPU3, so that each GPU performs a next round of training based on the updated model parameters.

In one example, GPU0, GPU1, GPU2, GPU3, GPU4, GPU5, GPU6, and GPU7 are used as an example for illustrating how eight GPUs perform deep learning training in parallel according to corresponding training data sets, where a master working group includes GPU0 and GPU1, a first slave working group includes GPU2 and GPU3, a second slave working group includes GPU4 and GPU5, and a fourth slave working group includes GPU6 and GPU7. After training is completed on the first layer, GPU1 transmits modification parameters generated through training by GPU1 to GPU0, GPU3, GPU5, and GPU7 transmit respective modification parameters generated through training by GPU3, GPU5, and GPU7 to GPU2, GPU4, and GPU6, which are corresponding secondary GPUs in various slave working groups. Also, each secondary GPU transmits, to GPU0, modification parameters generated through training by the secondary GPU and the received modification parameters that are generated by the corresponding slave GPUs and on which exchange has not been performed. After training is completed on the fourth layer, GPU1 transmits modification parameters generated through training by GPU1 to GPU0, GPU3, GPU5, and GPU7 transmit respective modification parameters generated through training by GPU3, GPU5, and GPU7 to GPU2, GPU4, and GPU6 (i.e., corresponding secondary GPUs), and each secondary GPU transmits, to GPU0, modification parameters generated through training by the secondary GPU and the received modification parameters that are generated by the corresponding slave GPUs and on which exchange has not been performed. GPU0 modifies model parameters of a version of a predictive model managed by GPU0 based on the modification parameters that correspond to the number of layers and that are generated by GPU0 and the received modification parameters that correspond to the layers, and transmits the modified model parameters of the version of the predictive model managed by GPU0 to GPU1 and each secondary GPU. Each secondary GPU transmits the received modified model parameters to a corresponding slave GPU, so that each GPU performs a next round of training based on the updated model parameters.

TABLE 1

Training time and acceleration multiple

| | 256 | 256*(2 GPU) | 256*(4 GPU) | 256*(8 GPU) | Note |
|---|---|---|---|---|---|
| K80 | 17.5 s | 23.5 s | 25 s | 29.4 s | Conventional solution |
| K80 | 17.5 s | 18.7 s | 18.9 s | 20.1 s | Solution in this application |
| Acceleration ratio | 1 | 1.25 | 1.32 | 1.46 | |
| M40 | 5.9 s | 7.2 s | 9.9 s | 11.3 s | Conventional solution |
| M40 | 5.9 s | 6.1 s | 6.2 s | 6.9 s | Solution in this application |
| Acceleration ratio | 1 | 1.18 | 1.59 | 1.63 | |

Table 1 shows a time (in units of seconds) required for performing deep learning training on 256*20 pictures in different implementations according to this application, a time (in units of seconds) required for performing deep learning training on 256*20 pictures in corresponding conventional technical solutions, and an acceleration ratio compared with the corresponding conventional technical solutions. The acceleration ratio is defined here, in some embodiments, as a time required for performing deep learning training on 256*20 pictures in a corresponding implementations according to this application to a time required for performing deep learning training on 256*20 pictures in the conventional technologies. According to this table, a training time for performing deep learning training in parallel by eight GPUs takes least processing time compared with the conventional technologies. That is, compared with the conventional technologies, the larger number of GPUs corresponds to greater acceleration ratio improvement.

Figure 9:
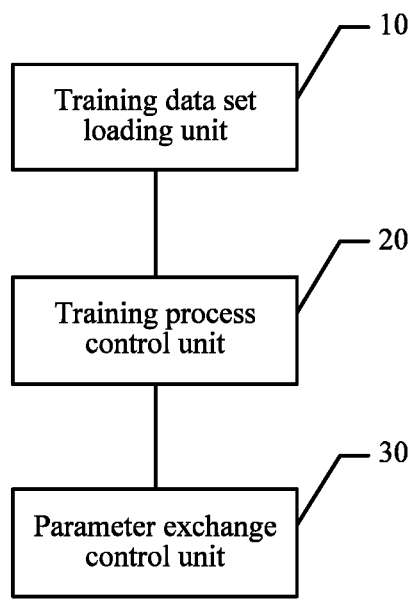
FIG. 9 is a schematic structural diagram of a data processing apparatus according to an embodiment of this application.

FIG. 9 is a schematic structural diagram of a data processing apparatus disclosed in this application. An electronic device according to one or more embodiments can include the data processing apparatus in FIG. 9 as a processor and a plurality of GPUs, such as the electronic device as illustrated in FIG. 1. The data processing apparatus includes a training data set loading unit 10, a training data set loading unit 10, and a parameter exchange control unit 30. The training data set loading unit 10 is configured to load corresponding training data sets to a plurality of graphics processors GPUs respectively, different GPUs corresponding to different training data sets. The training process control unit 20 is configured to control the plurality of GPUs to perform respective training processes according to the corresponding training data sets, so that the GPUs obtain respective sets of modification parameters generated through training. The parameter exchange control unit 30 is configured to control, during the process training according to the corresponding training data sets by the plurality of GPUs, the plurality of GPUs to perform exchange processing on the modification parameters generated through training by the plurality of GPUs, the number of modification parameters on which the exchange processing has been completed being greater than 0 when the training is completed.

According to the data processing apparatus disclosed in this application, the corresponding training data sets are loaded to the plurality of graphics processor GPUs respectively by using a processor; in the process of training according to the corresponding training data sets by the plurality of GPUs, the plurality of GPUs is controlled to perform exchange processing on modification parameters that are in the modification parameters generated through training by the plurality of GPUs and on which exchange has not been performed. The process of training according to the training data sets by the plurality of GPUs and the process of exchanging the modification parameters generated through training by the plurality of GPUs can be processed in parallel. Therefore, when the plurality of GPUs completes training according to the corresponding training data sets, the number of modification parameters on which exchange processing has been performed is greater than 0. This can shorten a waiting time of the plurality of GPUs, thereby shortening a time consumed for each round of training, shortening a time consumed for completing entire deep learning training, and improving an acceleration ratio of a device.

In the process of training according to the corresponding training data sets by the plurality of GPUs, to reduce frequent transmission of modification parameters between the GPUs, the transmission of the modification parameters may be further modified according to certain criteria.

In one embodiment, this application provides a data processing apparatus. The training process control unit 20 may include a backpropagation training control subunit, configured to control the plurality of GPUs to perform backpropagation training processes the corresponding training data sets on hidden layers.

In some embodiments, the parameter exchange control subunit 30 includes a preset-hidden-layer parameter exchange control subunit or a predetermined-data-amount parameter exchange control subunit.

The preset-hidden-layer parameter exchange control subunit may be configured to control, after the plurality of GPUs completes the backpropagation training according to the corresponding training data sets on a preset hidden layer, the plurality of GPUs to perform exchange processing on the modification parameters generated through training by the plurality of GPUs, the preset hidden layer being a layer other than the last layer in the hidden layers.

The predetermined-data-amount parameter exchange control subunit may be configured to control, when a data amount of the modification parameters generated through training by the plurality of GPUs reaches a predetermined data amount, the plurality of GPUs to perform exchange processing on the modification parameters generated through training by the plurality of GPUs, the predetermined data amount being less than a data amount of all modification parameters generated in the respective backpropagation training processes performed by the plurality of GPUs according to the corresponding training data sets.

When the modification parameters generated through training by the plurality of GPUs are stored in cache registers in respective video memories of the plurality of GPUs, correspondingly, the predetermined-data-amount parameter exchange control subunit can be configured to control, when the cache registers of the plurality of GPUs are full, the plurality of GPUs to perform exchange processing on respective modification parameters stored in the cache registers. In some embodiments, the predetermined data amount corresponds to a capacity of the cache registers.

In one embodiment, the parameter exchange control unit 30 may be configured to control, in the process of training according to the corresponding training data sets by the plurality of GPUs, every two of the plurality of GPUs to exchange the modification parameters generated through training by the two GPUs.

Figure 10:
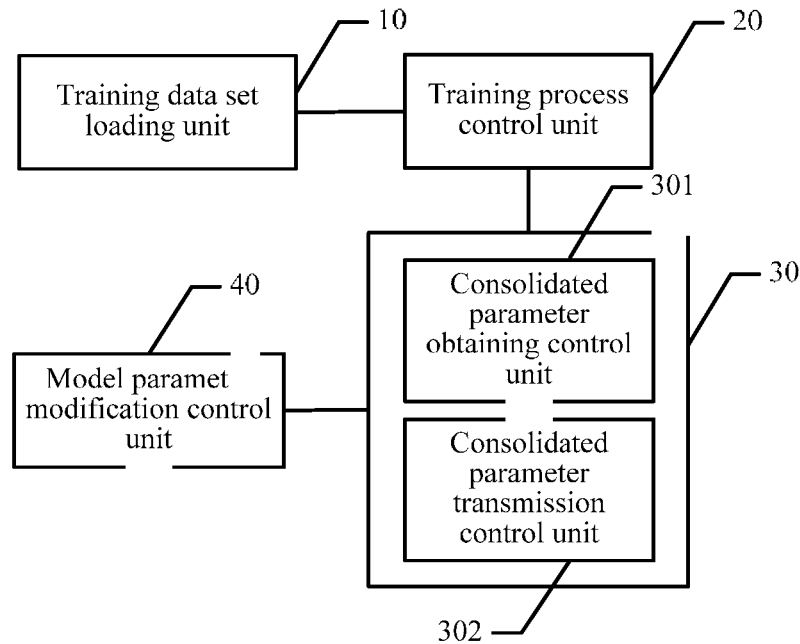
FIG. 10 is a schematic structural diagram of a data processing apparatus according to an embodiment of this application.

FIG. 10 is a schematic structural diagram of a data processing apparatus of an electronic device disclosed in this application. In some embodiments, the data processing apparatus includes a training data set loading unit 10, a training process control unit 20, and a parameter exchange control unit 30. The training data set loading unit 10 is configured to load corresponding training data sets to a plurality of graphics processors GPUs respectively, different GPUs corresponding to different training data sets The training process control unit 20 is configured to control the plurality of GPUs to perform respective training processes according to the corresponding training data sets, so that the GPUs obtain respective sets of modification parameters generated through training. The parameter exchange control unit 30 may include a consolidated parameter obtaining control unit 301, configured to control other GPUs than the master GPU in the plurality of GPUs to transmit modification parameters generated through training by the other GPUs to the master GPU, so that the master GPU obtains consolidated modification parameters; and a consolidated parameter transmission control unit 302, configured to control the master GPU to transmit the consolidated modification parameter to the other GPUs than the master GPU, one of the plurality of GPUs being the master GPU.

The apparatus may further include a model parameter modification control unit 40, configured to use, after controlling the plurality of GPUs to perform exchange processing each time, the modification parameters obtained through exchange to modify respective model parameters of various versions of a predictive model respectively managed by the GPUs and used for training; or use, after controlling the plurality of GPUs to complete training according to the corresponding training data sets, the modification parameters obtained through exchange to modify respective model parameters used of the respectively managed versions of the predictive model.

Figure 11:
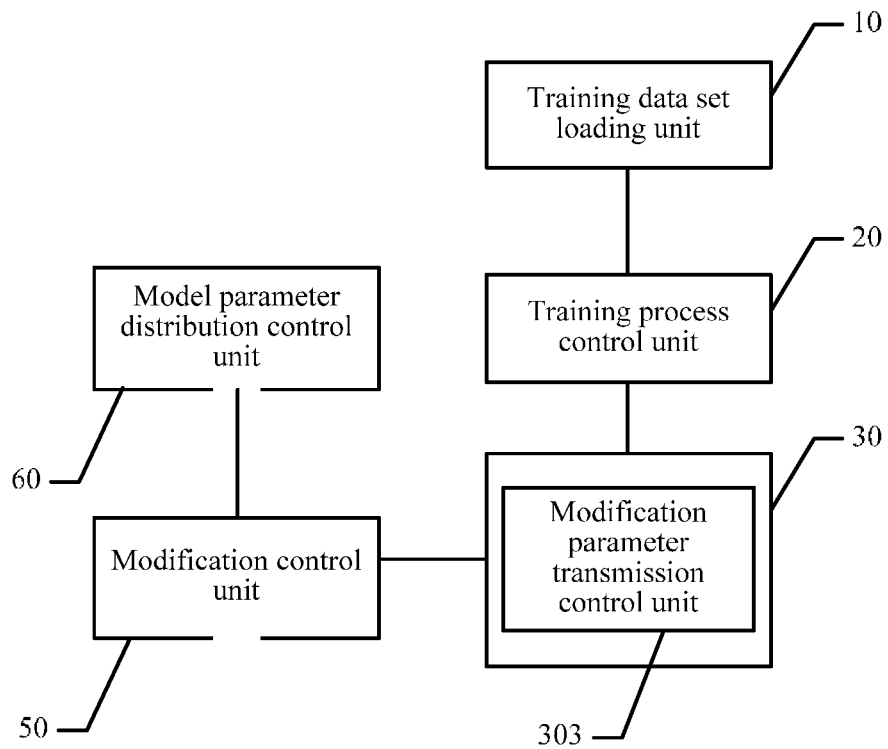
FIG. 11 is a schematic structural diagram of a data processing apparatus according to an embodiment of this application.

FIG. 11 is a schematic structural diagram of a data processing apparatus according to this application. In some embodiments, the data processing apparatus includes a training data set loading unit 10, a training process control unit 20, and a parameter exchange control unit 30. The training data set loading unit 10 is configured to load corresponding training data sets to a plurality of graphics processors GPUs respectively, different GPUs corresponding to different training data sets. The training process control unit 20 is configured to control the plurality of GPUs to perform respective training processes according to the corresponding training data sets, so that the GPUs obtain respective sets of modification parameters generated through training. The parameter exchange control unit 30 is configured to control, in the process of controlling the plurality of GPUs to perform the training processes according to the corresponding training data sets, the plurality of GPUs to perform exchange processing on the modification parameters generated through training by the plurality of GPUs, so that the number of modification parameters on which the exchange processing has been completed is greater than 0 when the training performed by the plurality of GPUs according to the corresponding training data sets completes. In some embodiments, the parameter exchange control unit 30 includes a modification parameter transmission control unit 303, and the modification parameter transmission control unit 303 is configured to control GPUs than the master GPU in the plurality of GPUs to transmit modification parameters generated through training by the other GPUs to the master GPU, and one of the plurality of GPUs is the master GPU.

The apparatus may further include a modification control unit 50, configured to control the master GPU to use modification parameters generated by the master GPU and the modification parameters obtained from the other GPUs to modify current model parameters of a version of a predictive model managed by the master GPU, to obtain modified model parameters of a version of a predictive model managed by the master GPU. The apparatus may further include a model parameter distribution control unit 60, configured to control the master GPU to transmit the modified model parameters to the other GPUs.

According to the data processing apparatus shown in FIG. 11, the other GPUs that are not the master GPU in the plurality of GPUs can transmit the modification parameters to the master GPU, hence reducing the number of exchanges of the modification parameters and a data exchange amount. That is, after the plurality of GPUs completes training according to the training data sets, the master GPU can complete modifying the current model parameters within a very short time, and transmits the modified model parameters to the other GPUs. This can further shorten a time consumed for each round of training and improving an acceleration ratio of a device. In addition, according to this example, only one GPU (that is, the master GPU) in the plurality of GPUs needs to modify the model parameters based on the modification parameters, and the other GPUs do not need to perform the operation, hence reducing workloads of the other GPUs.

In one embodiment, the GPUs are arranged into a plurality of working groups, and each working group includes at least one GPU. One of the working groups is used as a master working group, and other working groups are used as slave working groups. In addition, one GPU in the master working group is used as the master GPU, one GPU in each of the slave working groups is used as a secondary GPU, and other GPUs that are not the master GPU and not the secondary GPUs in the plurality of working groups are slave GPUs.

In some embodiments, the modification parameter transmission control unit 302 includes a first parameter exchange control unit, a second parameter exchange control unit, and a third parameter exchange control unit. The model parameter distribution control unit 60 includes a first distribution control unit and a second distribution control unit.

The first parameter exchange control unit is configured to control each slave GPU in each slave working group to transmit modification parameters generated through training by the slave GPU to a secondary GPU in the slave working group in which the slave GPU is located.

The second parameter exchange control unit is configured to control the secondary GPU in the slave working group to preprocess modification parameters generated through training by the secondary GPU and the modification parameters obtained from each slave GPU in the slave working group, and transmit preprocessed modification parameters to the master GPU.

The third parameter exchange control unit is configured to control each slave GPU in the master working group to transmit the modification parameters generated through training by the slave GPU to the master GPU.

The first distribution control unit is configured to control the master GPU to transmit the modified model parameters to the slave GPU in the master working group.

The second distribution control unit is configured to control the master GPU to transmit the modified model parameters to each secondary GPU, and control each secondary GPU to transmit the modified model parameters to a slave GPU in a slave working group in which the secondary GPU is located.

In some embodiments, the second parameter exchange control unit is configured to control the secondary GPU in the slave working group to add the modification parameters generated through training by the secondary GPU and the modification parameters obtained from each slave GPU in the slave working group, and to transmit modification parameters obtained through addition to the master GPU; or control the secondary GPU in the slave working group to calculate average values of the modification parameters generated through training by the secondary GPU and the modification parameters obtained from each slave GPU in the slave working group, and to transmit the calculated average values of the modification parameters to the master GPU.

In some embodiments, the first parameter exchange control unit is configured to, after training is completed on the preset hidden layer or when the modification parameters on which exchange has not been performed reaches the predetermined data amount, control each slave GPU in the slave working group to transmit the modification parameters generated through training to the secondary GPU in the slave working group in which the slave GPU is located.

In some embodiments, the third parameter exchange control unit is configured to, after training is completed on the preset layer or when the modification parameters on which exchange has not been performed reaches the predetermined data amount, control each slave GPU in the master working group to transmit the modification parameters generated through training to the master GPU.

In some embodiments, the training process control unit 20 is configured to control each slave GPU to store modification parameters generated through training to a cache register of a respective video memory.

In some examples, the first parameter exchange control unit is configured to control, when a cache register of the slave GPU in the slave working group is full, the slave GPU in the slave working group to transmit the modification parameters in the cache register to the secondary GPU in the slave working group in which the slave GPU is located.

The third parameter exchange control unit is configured to control, when a cache register of the slave GPU in the master working group is full, the slave GPU in the master working group to transmit the modification parameters in the cache register to the master GPU.

This application further discloses an electronic device. The electronic device includes a data processing apparatus disclosed in this application.

Moreover, FIG. 1 shows a hardware structure of the electronic device disclosed in this application. The electronic device includes one or more processors 102, a memory 101, a peripheral interface 103, and a plurality of GPUs 104. In some embodiments, the electronic device may further include a communications interface and a communications bus.

The one or more processors 102 are configured to execute a program.

The memory 101 is configured to store the program.

The program may include a program code, and the program code includes a computer operating instruction.

The processor 102 may be a central processing unit (CPU) or an application-specific integrated circuit (ASIC) or may be configured as one or more integrated circuits for implementing the embodiments of this application.

The memory 101 may include a high-speed RAM memory, may also include a non-volatile memory, for example, at least one magnetic disk memory.

The program may be specifically used for loading corresponding training data sets to a plurality of graphics processors GPUs, controlling the plurality of GPUs to perform respective training processes according to the corresponding training data sets, so that the GPUs obtain respective sets of modification parameters generated in a training process, and controlling, in the process of controlling the plurality of GPUs to performing the training processes according to the corresponding training data sets, the plurality of GPUs to perform exchange processing on the modification parameters generated through training by the plurality of GPUs, so that the number of modification parameters on which the exchange processing has been completed is greater than 0 when the training performed by the plurality of GPUs on the corresponding training data sets completes.

Finally, it should be noted that the terms herein such as first and second are used only to differentiate an entity or operation from another entity or operation, and do not require or imply any actual relationship or sequence between these entities or operations. In addition, the terms "include", "contain", or any other variants means to cover the non-exclusive inclusion, for example, a process, method, product, or device that includes a list of elements is not necessarily limited to those elements, but may include other elements not expressly listed or inherent to such a process, method, product, or device. Without other limitation, elements restricted by a statement "including one . . . " does not exclude that additional same elements exist in a process, method, product, or device including the elements.

It should be noted that the embodiments in this specification are described in a manner highlighting the differences between described variations. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Further, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use this application. Various modifications to these embodiments and the general principles defined in the present disclosure may be implemented in other embodiments without departing from the spirit and scope of this application. Therefore, the present application is not limited to these embodiments illustrated in the present disclosure, but to conform to the broadest scope consistent with the principles and features disclosed in the present disclosure.

What is claimed is:

1. A data processing method, comprising:
providing, by a processor, different training data sets to a plurality of graphics processing units (GPUs), respectively;
controlling, by the processor, the plurality of GPUs to generate respective sets of modification parameters by performing respective training processes in a parallel manner using respectively managed versions of a predictive model according to the corresponding training data sets;
controlling, by the processor, the plurality of GPUs to exchange, before an entirety of the sets of modification parameters is generated, a portion of the sets of modification parameters that have been generated by the plurality of GPUs; and
causing, by the processor, the plurality of GPUs to modify the respectively managed versions of the predictive model according to the portion of the sets of modification parameters exchanged among the plurality of GPUs.

2. The data processing method according to claim 1, further comprising:
controlling the plurality of GPUs to store the respective sets of modification parameters generated by the plurality of GPUs in respective video memories of the plurality of GPUs.

3. The data processing method according to claim 1, wherein
the controlling, by the processor, the plurality of GPUs to generate the respective sets of modification parameters comprises:
controlling the plurality of GPUs to perform in parallel respective backpropagation processes on hidden layers of the predictive model according to the corresponding training data sets, and
the controlling, by the processor, the plurality of GPUs to exchange the portion of the sets of modification parameters comprises:
controlling, after the plurality of GPUs performs a portion of the backpropagation processes on a preset hidden layer of the predictive model or when a data amount of the portion of the sets of modification parameters reaches a predetermined data amount, the plurality of GPUs to exchange the portion of the sets of modification parameters, the preset hidden layer being a layer other than a last layer in the hidden layers, and the predetermined data amount being less than a data amount of the entirety of the sets of modification parameters generated by the plurality of GPUs.

4. The data processing method according to claim 3, wherein
the respective sets of modification parameters generated by the plurality of GPUs are stored in cache registers in respective video memories of the plurality of GPUs,
the predetermined data amount corresponds to a capacity of the cache registers, and
the controlling, by the processor when the data amount of the portion of the sets of modification parameters reaches the predetermined data amount, the plurality of GPUs to exchange the portion of the sets of modification parameters comprises:
controlling, by the processor when the cache registers of the plurality of GPUs are full, the plurality of GPUs to exchange respective modification parameters stored in the cache registers.

5. The data processing method according to claim 1, wherein the controlling, by the processor, the plurality of GPUs to exchange the portion of the sets of modification parameters comprises:
controlling, by the processor during the respective training processes, every two of the plurality of GPUs to exchange modification parameters generated by the corresponding two of the plurality of GPUs.

6. The data processing method according to claim 1, wherein
the plurality of GPUs includes a master GPU and one or more other GPUs, and
the controlling, by the processor, to exchange the portion of the sets of modification parameters comprises:
controlling the one or more other GPUs to transmit modification parameters generated by the one or more other GPUs to the master GPU;
controlling the master GPU to obtain consolidated modification parameters according to the modification parameters generated by the one or more other GPUs and modification parameters generated by the master GPU; and
controlling the master GPU to transmit the consolidated modification parameters to the one or more other GPUs.

7. The data processing method according to claim 1, wherein the plurality of GPUs are controlled to modify the respectively managed versions of the predictive model (a) after the portion of the sets of modification parameters is exchanged among the plurality of GPUs and before the entirety of the sets of modification parameters is generated, or (b) after the entirety of the sets of modification parameters is generated.

8. The data processing method according to claim 1, wherein
the plurality of GPUs includes a master GPU and one or more other GPUs, and
the controlling, by the processor, to exchange the portion of the sets of modification parameters comprises:
controlling the one or more other GPUs to transmit modification parameters generated by the one or more other GPUs to the master GPU;
controlling the master GPU to modify a current version of the predictive model managed by the master GPU to become a modified version of the predictive model managed by the master GPU according to the modification parameters generated by the one or more other GPUs and modification parameters generated by the master GPU; and
controlling the master GPU to transmit modified model parameters of the modified version of the predictive model managed by the master GPU to the one or more other GPUs.

9. The data processing method according to claim 8, wherein
the plurality of GPUs is arranged into a plurality of working groups, including a master working group and one or more slave working groups,
the master working group includes the master GPU,
each of the one or more slave working groups includes a respective secondary GPU,
GPUs in the plurality of working groups that are not the master GPU and not one or more secondary GPUs of the one or more slave working groups are slave GPUs,
the controlling the one or more other GPUs to transmit modification parameters generated by the one or more other GPUs to the master GPU comprises:
controlling each slave GPU in the master working group to transmit modification parameters generated by the slave GPU in the master working group to the master GPU;
controlling each slave GPU in each slave working group to transmit modification parameters generated by the slave GPU to a secondary GPU in the corresponding slave working group; and
controlling each secondary GPU in each slave working group to transmit modification parameters of the slave working group to the master GPU, and
the controlling the master GPU to transmit the modified model parameters of the modified version of the predictive model managed by the master GPU to the one or more other GPUs comprises:
controlling the master GPU to transmit the modified model parameters to each slave GPU in the master working group; and
controlling the master GPU to transmit the modified model parameters to each secondary GPU, and controlling each secondary GPU to transmit the modified model parameters to each slave GPU in the corresponding slave working group in which the secondary GPU is located.

10. The data processing method according to claim 9, wherein the controlling each secondary GPU in each slave working group to transmit the modification parameters of the slave working group to the master GPU comprises:
controlling the secondary GPU in each slave working group to preprocess the modification parameters generated by the secondary GPU and the modification parameters obtained from each slave GPU in the slave working group, and to obtain preprocessed modification parameters, a data amount of the preprocessed modification parameters being less than a data amount of the modification parameters before preprocessing; and
controlling the secondary GPU to transmit the preprocessed modification parameters to the master GPU.

11. The data processing method according to claim 10, wherein the controlling the secondary GPU in the slave working group to preprocess the modification parameters generated by the secondary GPU and the modification parameters obtained from each slave GPU in the slave working group comprises:

controlling the secondary GPU in a first slave working group to generate an added value of one of the modification parameters generated by the secondary GPU and a corresponding one of the modification parameters obtained from each slave GPU in the first slave working group, and to transmit the added value as a first preprocessed modification parameter to the master GPU; or controlling the secondary GPU in a second slave working group to calculate an average value of one of the modification parameters generated by the secondary GPU and a corresponding one of the modification parameters obtained from each slave GPU in the second slave working group, and to transmit the calculated average value as a second preprocessed modification parameter to the master GPU.

12. A data processing apparatus, comprising:
processing circuitry configured to:
provide different training data sets to a plurality of graphics processing units (GPUs), respectively;
control the plurality of GPUs to generate respective sets of modification parameters by performing respective training processes in a parallel manner using respectively managed versions of a predictive model according to the corresponding training data sets;
control the plurality of GPUs to exchange, before an entirety of the sets of modification parameters is generated, a portion of the sets of modification parameters that have been generated by the plurality of GPUs; and
cause the plurality of GPUs to modify the respectively managed versions of the predictive model according to the portion of the sets of modification parameters exchanged among the plurality of GPUs.

13. The data processing apparatus according to claim 12, wherein the processing circuitry is further configured to:
control the plurality of GPUs to perform in parallel respective backpropagation processes on hidden layers of the predictive model according to the corresponding training data sets; and
control, after the plurality of GPUs performs a portion of the backpropagation processes on a preset hidden layer of the predictive model or when a data amount of the portion of the sets of modification parameters reaches a predetermined data amount, the plurality of GPUs to exchange the portion of the sets of modification parameters, the preset hidden layer being a layer other than a last layer in the hidden layers, and the predetermined data amount being less than a data amount of the entirety of the sets of modification parameters generated by the plurality of GPUs.

14. The data processing apparatus according to claim 13, wherein
the respective sets of modification parameters generated by the plurality of GPUs are stored in cache registers in respective video memories of the plurality of GPUs,
the predetermined data amount corresponds to a capacity of the cache registers, and
the processing circuitry is further configured to:
control, when the cache registers of the plurality of GPUs are full, the plurality of GPUs to exchange respective modification parameters stored in the cache registers.

15. The data processing apparatus according to claim 12, wherein the processing circuitry is further configured to:

control, during the respective training processes, every two of the plurality of GPUs to exchange modification parameters generated by the corresponding two of the plurality of GPUs.

16. The data processing apparatus according to claim 12, wherein
the plurality of GPUs includes a master GPU and one or more other GPUs, and
the processing circuitry is further configured to:
control the one or more other GPUs to transmit modification parameters generated by the one or more other GPUs to the master GPU;
control the master GPU to obtain consolidated modification parameters according to the modification parameters generated by the one or more other GPUs and modification parameters generated by the master GPU; and
control the master GPU to transmit the consolidated modification parameters to the one or more other GPUs.

17. The data processing apparatus according to claim 12, wherein the processing circuitry is configured to control the plurality of GPUs to modify the respectively managed versions of the predictive model (a) after the portion of the sets of modification parameters is exchanged among the plurality of GPUs and before the entirety of the sets of modification parameters is generated, or (b) after the entirety of the sets of modification parameters is generated.

18. The data processing apparatus according to claim 12, wherein
the plurality of GPUs includes a master GPU and one or more other GPUs, and
the processing circuitry is further configured to:
control the one or more other GPUs to transmit modification parameters generated by the one or more other GPUs to the master GPU;
control the master GPU to modify a current version of the predictive model managed by the master GPU to become a modified version of the predictive model managed by the master GPU according to the modification parameters generated by the one or more other GPUs and modification parameters generated by the master GPU; and
control the master GPU to transmit modified model parameters of the modified version of the predictive model managed by the master GPU to the one or more other GPUs.

19. The data processing apparatus according to claim 18, wherein
the plurality of GPUs is arranged into a plurality of working groups, including a master working group and one or more slave working groups,
the master working group includes the master GPU,
each of the one or more slave working groups includes a respective secondary GPU,
GPUs in the plurality of working groups that are not the master GPU and not one or more secondary GPUs of the one or more slave working groups are slave GPUs, and
the processing circuitry is configured to:
control each slave GPU in the master working group to transmit modification parameters generated by the slave GPU in the master working group to the master GPU;

control each slave GPU in each slave working group to transmit modification parameters generated by the slave GPU to a secondary GPU in the corresponding slave working group;

control each secondary GPU in each slave working group to transmit modification parameters of the slave working group to the master GPU;

control the master GPU to transmit the modified model parameters to each slave GPU in the master working group; and control the master GPU to transmit the modified model parameters to each secondary GPU, and control each secondary GPU to transmit the modified model parameters to each slave GPU in the corresponding slave working group in which the secondary GPU is located.

20. The data processing apparatus according to claim 19, wherein the processing circuitry is configured to:

control the secondary GPU in each slave working group to preprocess the modification parameters generated by the secondary GPU and the modification parameters obtained from each slave GPU in the slave working group, to obtain preprocessed modification parameters, a data amount of the preprocessed modification parameters being less than a data amount of the modification parameters before preprocessing; and control the secondary GPU to transmit the preprocessed modification parameters to the master GPU.

21. The data processing apparatus according to claim 20, wherein the processing circuitry is configured to:

control the secondary GPU in a first slave working group to generate an added value of one of the modification parameters generated by the secondary GPU and a corresponding one of the modification parameters obtained from each slave GPU in the first slave working group, and to transmit the added value as a first preprocessed modification parameter to the master GPU; or control the secondary GPU in a second slave working group to calculate an average value of one of the modification parameters generated by the secondary GPU and a corresponding one of the modification parameters obtained from each slave GPU in the second slave working group, and to transmit the calculated average value as a second preprocessed modification parameter to the master GPU.

22. A non-transitory computer-readable storage medium storing computer-readable instructions, which when executed by a processor, cause the processor to perform a method, and the method comprises:

providing different training data sets to a plurality of graphics processing units (GPUs), respectively;

controlling the plurality of GPUs to generate respective sets of modification parameters by performing respective training processes in a parallel manner using respectively managed versions of a predictive model according to the corresponding training data sets;

controlling the plurality of GPUs to exchange, before an entirety of the sets of modification parameters is generated, a portion of the sets of modification parameters that have been generated by the plurality of GPUs; and causing the plurality of GPUs to modify the respectively managed versions of the predictive model according to the portion of the sets of modification parameters exchanged among the plurality of GPUs.

* * * * *